United States Patent
Schneider et al.

(10) Patent No.: US 11,755,002 B2
(45) Date of Patent: Sep. 12, 2023

(54) METHOD AND SYSTEM FOR PROCESSING OPTICAL LENSES

(71) Applicant: SCHNEIDER GMBH & CO. KG, Fronhausen (DE)

(72) Inventors: Gunter Schneider, Marburg (DE); Stephan Huttenhuis, Niederweimar (DE)

(73) Assignee: SCHNEIDER GMBH & CO. KG, Fronhausen (DE)

( * ) Notice: Subject to any disclaimer, the term of this patent is extended or adjusted under 35 U.S.C. 154(b) by 0 days.

(21) Appl. No.: 16/304,068

(22) PCT Filed: May 19, 2017

(86) PCT No.: PCT/EP2017/025139
§ 371 (c)(1),
(2) Date: Nov. 21, 2018

(87) PCT Pub. No.: WO2017/202502
PCT Pub. Date: Nov. 30, 2017

(65) Prior Publication Data
US 2019/0265683 A1    Aug. 29, 2019

(30) Foreign Application Priority Data

May 25, 2016  (DE) .................... 10 2016 006 239.8
Jun. 28, 2016  (DE) .................... 10 2016 007 837.5

(51) Int. Cl.
*G05B 19/418* (2006.01)
*B29D 11/00* (2006.01)
*B24B 13/00* (2006.01)

(52) U.S. Cl.
CPC .. *G05B 19/41865* (2013.01); *B29D 11/00423* (2013.01); *B24B 13/0037* (2013.01); *G05B 2219/32361* (2013.01)

(58) Field of Classification Search
CPC .... G05B 19/41865; G05B 2219/32361; B29D 11/00423; B24B 13/0037
See application file for complete search history.

(56) References Cited

U.S. PATENT DOCUMENTS 4,006,563 A    2/1977   Charlot
4,544,318 A    10/1985  Nagatomo et al.
(Continued)

FOREIGN PATENT DOCUMENTS

CN    102226876 A    10/2011
CN    105398068 A    3/2016
(Continued)

OTHER PUBLICATIONS

Anonymous: "Modulo Line, Automated lens processing, intelligently combined"; Internet brochure; XP-002766329; Jan. 19, 2017; https://www.schneider-om.com/fileadmin/media/schneider-om/opthalmics/Lines/Brochure-modulo-line.PDF.
(Continued)

*Primary Examiner* — Charles R Kasenge
(74) *Attorney, Agent, or Firm* — David S. Safran; Calderon Safran & Cole P.C.

(57) ABSTRACT

A method and a system for processing optical lenses in which the lenses are conveyed to individual processing apparatuses or processing lines corresponding to an assignment. The assignment takes into consideration maintenance that is due.

42 Claims, 6 Drawing Sheets

(56) References Cited

U.S. PATENT DOCUMENTS

| | | | |
|---|---|---|---|
| 4,727,684 A | 3/1988 | Kobayashi et al. | |
| 5,024,315 A | 6/1991 | Ward | |
| 5,372,241 A | 12/1994 | Matsumoto | |
| 5,551,348 A | 9/1996 | Matsumoto | |
| 5,555,504 A | 9/1996 | Lepper et al. | |
| 5,744,357 A | 4/1998 | Wang et al. | |
| 5,804,107 A | 9/1998 | Martin et al. | |
| 5,844,802 A | 12/1998 | Lepper et al. | |
| 5,884,746 A | 3/1999 | Leisner et al. | |
| 5,947,259 A | 9/1999 | Leisner et al. | |
| 6,039,899 A | 3/2000 | Martin et al. | |
| 6,071,440 A | 6/2000 | Wang et al. | |
| 6,336,546 B1 | 1/2002 | Lorenz | |
| 6,439,870 B1 | 8/2002 | Marceau et al. | |
| 6,618,692 B2 * | 9/2003 | Takahashi | H01L 22/20 257/E21.525 |
| 6,654,663 B1 | 11/2003 | Jokela | |
| 6,716,294 B1 | 4/2004 | Vetrini | |
| 6,738,682 B1 | 5/2004 | Pasadyn | |
| 6,836,692 B2 | 12/2004 | Leavitt et al. | |
| 6,854,583 B1 | 2/2005 | Horn | |
| 7,090,559 B2 | 8/2006 | Vulich et al. | |
| 7,801,641 B2 | 9/2010 | Yoshikawa et al. | |
| 8,241,534 B2 | 8/2012 | Akiyama | |
| 8,397,898 B2 | 3/2013 | Buchmann et al. | |
| 8,616,150 B2 | 12/2013 | Savoie et al. | |
| 8,784,160 B2 | 7/2014 | Breme | |
| 9,031,682 B2 | 5/2015 | Tanaka et al. | |
| 9,340,669 B2 | 5/2016 | Schneider et al. | |
| 9,840,373 B2 | 12/2017 | Schneider | |
| 9,908,714 B2 | 3/2018 | Schneider | |
| 2002/0035447 A1 * | 3/2002 | Takahashi | H01L 22/20 702/188 |
| 2003/0017794 A1 * | 1/2003 | Kozakai | B24B 51/00 351/159.76 |
| 2003/0031540 A1 | 2/2003 | Leavitt et al. | |
| 2003/0067889 A1 | 4/2003 | Petite | |
| 2003/0115510 A1 * | 6/2003 | Takayama | G05B 23/0283 714/47.1 |
| 2005/0106999 A1 | 5/2005 | Vulich et al. | |
| 2008/0184114 A1 * | 7/2008 | Hano | G05B 19/41865 715/700 |
| 2009/0228129 A1 * | 9/2009 | Moyne | G05B 19/41865 700/102 |
| 2011/0166688 A1 * | 7/2011 | Moyne | G06Q 10/06 700/104 |
| 2012/0209416 A1 | 8/2012 | Tanaka et al. | |
| 2013/0270759 A1 | 10/2013 | Schneider et al. | |
| 2014/0067108 A1 | 3/2014 | Pedigo et al. | |
| 2014/0228995 A1 | 8/2014 | Tanaka et al. | |
| 2015/0053530 A1 * | 2/2015 | Schneider | B24B 13/0037 198/347.1 |
| 2015/0105892 A1 | 4/2015 | Townsend et al. | |
| 2015/0314411 A1 * | 11/2015 | Samukawa | B23Q 17/2457 451/5 |
| 2016/0149996 A1 * | 5/2016 | Eckert | H04L 67/2842 709/217 |
| 2017/0269573 A1 * | 9/2017 | Holzkamper | G05B 19/409 |
| 2018/0318978 A1 | 11/2018 | Schneider et al. | |

FOREIGN PATENT DOCUMENTS

| | | |
|---|---|---|
| DE | 3614165 A1 | 10/1987 |
| DE | 29823464 U1 | 6/1999 |
| DE | 19815728 A1 | 10/1999 |
| DE | 10353553 A1 | 6/2005 |
| DE | 102004021696 A1 | 11/2005 |
| DE | 102007059303 A1 | 6/2009 |
| EP | 2489469 A1 | 8/2012 |
| GB | 1567587 A | 5/1980 |
| GB | 2344439 A | 6/2000 |
| JP | S60146646 A | 8/1985 |
| WO | 02087861 A2 | 7/2002 |
| WO | 2008042277 A1 | 10/2008 |

OTHER PUBLICATIONS

Kevin Cross: "Where Is Automation Taking the 21st Century Lab?"; Internet article; XP-002772552; Jul. 25, 2017; https://opticallabproducts.com/where-is-automation-taking-the-21st-century-lab/.

Der Augen Optiker: "Technik für neue Ansprüche an Brillengläser", 2003, pp. 50-51.—ISSN 0004-7929 (English-language translation attached).

Schiffhauer, Nils: "Durchbrüche an der Wellenfront", Frankfurter Allgemeine Sonntagszeitung, Apr. 5, 2009, 4 pages, No. 14 (English-language translation attached).

Rexroth Bosch Group: "Transfersystem TS 2plus", Apr. 2011, pp. 0-4, 1-1 to 1-10, 4-1 to 4-25 & 5-1 to 5-40.

Konrad, Beat: "On-block Manufacturing Back side processing advantages", https://www.satisloh.com/fileadmin/contents/Technical-papers/On-Block-Manufacturing_EN.pdf, May 6, 2016, pp. 1-23, XP055471305.

Hao Zhang et al., "Remote service and remote engineering support system of manufacturing enterprises", Tongji University Press, May 2002, pp. 197-199, ISBN 7-5608-2421-8, 1st Edition, Shanghai, China.

* cited by examiner

METHOD AND SYSTEM FOR PROCESSING OPTICAL LENSES

BACKGROUND OF THE INVENTION

Field of the Invention

The present invention is directed to a method and system for processing optical lenses, in which the lenses are conveyed to individual processing systems or production lines corresponding to an assignment.

Description of the Related Art

International Patent Application Publication WO 2013/131656 A2, and corresponding U.S. Pat. Nos. 9,840,373 B2 and 9,908,714 B2, and which form the starting point of this invention, disclose a system and a method for processing optical lenses, whereby lenses or lens carriers with lenses are optionally conveyed to independently-operating processing apparatuses, which form a production line. Jobs with lenses that are to be processed, processing plans, status information, process data and the like are managed by a central system control and are displayed, if necessary. The conveying of lenses optionally to various processing apparatuses and in any sequence together with the independently-operating processing apparatuses, which request jobs autonomously and can route them to said apparatuses, allows for a significantly more flexible processing and in particular also a significantly simpler expansion of existing installations than earlier production lines. In general, an extensive optimization of the use of the processing apparatuses is difficult, but desirable.

German Patent Application Publication DE 602 07 588 T2, and corresponding U.S. Pat. No. 6,738,682 B1, generally relate to the field of the production of semiconductor devices and disclose a method for state estimation and allocation for a production system. The production system has multiple tools, which can be connected to a network, wherein the tools are grouped into sets of the same tools. A controller of the production system has a control function component and an observer component, wherein the observer component estimates and updates the states of the production system, and the control function component uses this state information to set the operating instruction parameters for the tools. The estimation of the states is done based on a statistical mathematical model or an estimation algorithm, similar to a Kalman filter. A planning controller implements a planning model, in which it can be ensured that the tools are utilized in an efficient way. The planning controller has information based on which the controller knows when the estimated parameters for a tool state have a significant uncertainty. This is a good period to perform maintenance operations on the tool, since the qualification subsequent to the maintenance yields new information on the state of the tool parameters. By this procedure, shutdown time can be reduced by scheduling events at a time when the latter are actually necessary.

Regarding the above-mentioned production system or method, however, no optimized sequences taking into consideration available servicing and thus resultant downtime are disclosed.

SUMMARY OF THE INVENTION

The object of this invention is to indicate a method and a system for processing optical lenses, wherein an efficient processing is made possible, in particular also taking into consideration current conditions with very good processing quality.

This invention relates to a method for processing optical lenses, in particular eyeglass lenses, whereby the lenses are optionally processed by various processing systems and/or production lines with multiple processing apparatuses corresponding to an assignment. The invention also relates to a system for processing optical lenses, in particular eyeglass lenses, with multiple processing systems—in particular forming one or more production lines—and a system control for assignment of lenses to a respective production line.

The processing of optical lenses, in particular eyeglass lenses, is carried out in multiple steps or in multiple separate processing systems. The processing can comprise in particular locking, joining or another (temporary) connection, such as adhesion with adhesive tape, delaying, intermediate storage or sorting or stacking, shaping or machining, polishing, testing or measuring, marking, coating and/or cleaning.

This invention relates in particular to a system with multiple processing systems and/or with at least one production line for processing optical lenses, especially preferably eyeglass lenses. The system or the production line comprises multiple, in particular (largely) independently-operating, processing systems. Especially preferably, the system or the production line (also) comprises multiple processing systems for the same processing tasks in order, for example, to increase the throughput. If necessary, the system comprises multiple production lines that in particular operate independently of one another and especially preferably a transfer system or transport system, in order to convey the lenses optionally to the processing systems or production lines.

A "processing system" in terms of this invention is preferably a machine or an assembly that can operate without additional components. Preferably, a processing system is stand-alone or the processing system can independently perform processing of lenses. Especially preferably, a processing system is designed as a separate module, so that a system or a facility can have multiple such modular processing systems or can be built up or put together from the latter. According to one aspect of this invention, the lenses are processed by various processing systems or production lines with multiple processing systems corresponding to an assignment. A corresponding conveying is carried out in particular by means of a transfer or transport system. The assignment is scheduled or changed according to the proposed solution preferably by an in particular central system control, as an alternative or in addition by a processing line taking into consideration servicing that is due or to be expected of the processing apparatuses or associated downtimes.

This invention makes possible in particular optimization of utilization and/or ensuring of high processing quality by taking into consideration or scheduling and in particular controlling the servicing.

"Servicing" is preferably defined according to the invention as the servicing, inspection, overhauling and/or repair and/or upgrading of processing apparatuses.

The term "maintenance" and is used below or according to the invention preferably synonymously for servicing measures (maintenance, inspection, overhauling, repair, and/or upgrading) or is preferably to be defined in this sense.

In particular, according to the proposed solution, a preventive or scheduled servicing is made possible or carried out.

Especially preferably, servicing for a processing system is scheduled or performed when the job backlog or utilization is low, when the means necessary for the servicing are available, when another production line or processing system is available for the same processing tasks, and/or when another postponement of the servicing is not possible. This is conducive to efficient processing and/or high processing quality and/or high availability of the system.

Especially preferably, servicing that is scheduled or to be expected is delayed when the job backlog or the utilization is low and/or another processing line or processing apparatus is available for the same processing operation. This is conducive to efficient processing and/or high processing quality and/or high availability of the system.

According to a second, also independently-achievable aspect of this invention, preferably central management and/or a service indicator is used that schedules, outputs, logs, displays and/or stores or archives the servicing that is due or to be expected and/or that has been performed and/or associated downtimes of the individual processing apparatuses.

Especially preferably, a central detection, management, scheduling and/or planning of the servicing of the individual processing apparatuses, especially preferably by means of the (central) system control or another control, is carried out. This is conducive to efficient processing and/or high processing quality and/or high availability of the system.

Preferably, a processing apparatus or processing line for which servicing is due in particular is already firmly scheduled or is performed, is no longer assigned for further processing tasks or is assigned only for subordinate processing tasks or for processing tasks with lesser quality requirements and/or is (temporarily) blocked for assignment of lenses.

According to a third, also independently-achievable aspect of this invention, central management of instructions for servicing the individual processing apparatuses is carried out, wherein the respective instructions are output or can be displayed in a decentralized manner to the respective processing apparatuses. The instructions comprise in particular written directions and drawing depictions and/or animations or movies, which can be output, in particular can be displayed, on the screen of the respective processing apparatus and/or on a mobile screen, such as a smartphone, laptop, or the like, from the site of the respective processing apparatus. Especially preferably, the system control automatically controls which instructions are output or can be displayed while taking into consideration the respective processing apparatus and the scheduled or necessary servicing.

The preferred output of instructions for servicing to the individual processing apparatuses to be serviced makes it possible for a technician to perform servicing of the processing apparatus very efficiently. Preferably, in this case, an exchange or chat between the respective technician and a service manager or, for example, even a technician of the manufacturer of the processing apparatus and/or an expert system is also possible.

To facilitate the exchange between the respective technician and a service manager or, for example, a manufacturer's technician, according to an especially preferred, also independently-achievable fourth aspect, data glasses or a camera, thus in particular glasses with an integrated camera, are used, so that significantly better guidance of the technician on site is made possible. For example, a remote service manager or a manufacturer's technician can namely have the on-site situation of the processing apparatus to be overhauled transmitted visually via the data glasses or camera—preferably with the point of view of the technician on site—and can consequently optimally support or direct the technician on site. This visual support is preferably also independently from the central control or management, and/or incorporation of the processing apparatus into a processing line can be achieved.

Especially preferably, a technician who would like to perform maintenance of a processing apparatus must first identify himself and/or cause an unlocking of the processing apparatus. This is done in particular with linking into or logging onto the preferably central system control or the like.

Especially preferably, a technician must also enter or confirm servicing measures that are carried out. This is detected and logged preferably by the in particular central system control, wherein input to the respective processing apparatus.

According to a fifth, also independently-achievable aspect of this invention, a preferably central management of the materials necessary for servicing is carried out. Management is carried out in particular by the central system control, an assigned control center, or the like. If necessary, ordering—in particular automatically or by the technician on site—can also be initiated here centrally.

When servicing is necessary, for example, the exchange of an expansion bellows, and this can be detected by the corresponding processing apparatus itself, the processing apparatus signals this to the system control. This signaling by the processing apparatus in question can be omitted when the system control, for example, determines the required maintenance because of a processing error that has occurred or in some other way. Then, the downtime (to be expected) is determined—in particular by the system control—and/or an opportune point in time for the maintenance is proposed. In addition, a corresponding operating plan is drawn up and preferably forwarded to a technician, who executes this operating plan and/or carries out the maintenance. To conclude the maintenance, the technician acknowledges the maintenance that has been done and optionally examines the inventory.

Especially preferably, it is possible to order new material, if necessary, such as a new part, for example a new expansion bellows, directly at the respective processing apparatus. As an alternative, the system control can itself determine or generate and/or order the required materials. Preferably, in this case, corresponding interfaces are then present in conventional inventory management systems.

Especially preferably, central management of maintenance intervals and/or maintenance measures is carried out.

Especially preferably, the planning or scheduling of the maintenance is carried out in particular by the system control automatically or is supported by the latter, for example by corresponding proposals, which can be confirmed or changed by a user.

The planning or scheduling of the maintenance is especially preferably supported and/or simplified by detection of errors or drifting of at least one processing task—i.e., of the processing quality.

Preferably, errors or drifting of at least one processing task is detected, and the processing apparatus(es) relevant in this respect is or are identified or detected in order to schedule or to carry out the maintenance thereof.

Preferably, based on detected or probable errors or drifting of the processing(s), the maintenance intervals for one or more processing apparatuses are scheduled or adjusted—in particular centrally from the system control.

The detection of errors or drifting of the processing task(s) is carried out preferably during or immediately after the processing task, in particular by one or more measuring apparatuses. If necessary, one or more testing systems can also be integrated in a processing line.

Especially preferably, measuring of processed lenses— which can be carried out continuously and/or is fully automated and/or reflective on one side—is possible or provided, wherein preferably the measuring can be carried out on a random-sample basis or in all lenses and/or after one or more processing tasks of a lens in order to detect errors or drifting of the processing task(s). The measuring is done, in particular, by one or more measuring apparatuses integrated into the system or the (respective) processing line, which apparatuses are also referred to as processing apparatuses for testing or measuring. As an alternative or in addition, such apparatuses can also be integrated into other processing apparatuses.

Especially preferably, measuring is also made possible in the case of blocked lenses, i.e., in the case of lenses that are held or fastened on one side, so that the previously very common type of manufacturing in the case of lenses or eyeglass lenses can be retained. However, other types of production, in particular so-called "block-free" manufacturing, are also possible.

The evaluation of the measurements for detecting errors and/or drifting is done preferably by a statistical search for sources of error in order to identify one or more processing apparatuses or processing lines that are responsible for errors and/or drifting of the processing task(s).

The search for sources of error can be carried out or supported by an intelligent or automated interpretation of error images (in this connection, for example, known patterns or typical structures that are caused by known influences or return to certain processing tasks).

In addition, sensor data of the processing apparatuses can be used to identify processing apparatuses, which are definitely or possibly responsible for errors or drifting.

Especially preferably, an optimization and/or automated adjustment of maintenance intervals is carried out, in particular taking into consideration detected errors or drifting and/or other parameters, for example, type and time period of processing tasks carried out in a processing apparatus and/or number of tool changes or the like.

To identify one or more processing apparatuses or processing lines that are (potentially) responsible for errors or drifting, in addition historical data or events or other probabilities can also be evaluated.

For errors or drifting, processing systems and/or production lines identified as at least potentially relevant can preferably be displayed and/or are planned in particular with priority or with absolute preference for corresponding maintenance—preferably automatically by the system control. As an alternative or in addition, such processing apparatuses or processing lines—preferably automatically by the system control—can be excluded at least as a precaution from other processing tasks and/or only used for processing tasks with lesser processing requirements, i.e., with lower processing quality.

Preferably, a quality monitoring and/or quality management is made possible on the basis of the preferably continuous or random-sample-like measurements and/or on the basis of determined processing quality. This is done in particular by the system control and/or a control center that is connected or formed therefrom.

The management, planning, controlling and/or logging of the maintenance and/or quality monitoring can be done in particular via the system control or a control center, which is connected to the system control or formed from the latter.

In terms of this invention, the control center forms a part of the system control, even when it is a unit or application separate therefrom.

Preferably, the lenses are conveyed preferably by means of a transport system selectively to one of multiple processing lines corresponding to an assignment. The assignment of already assigned lenses is preferably examined when detecting a new lens to be processed or a new job to be processed and/or in each case before the actual transfer of a lens from the transport system to the assigned processing line—in particular taking into consideration or based on assignment parameters—and optionally replaced by a new assignment, in particular, thus changed or adjusted.

Thus, an optimal utilization of the system and/or the processing lines and/or processing apparatuses and/or an especially efficient processing task with very good processing quality can be achieved or at least supported, since maintenance can be planned in a targeted manner.

The scheduling or changing of the assignment makes possible in particular a simplification of the production planning system and/or a high machine utilization of the machine and/or high flexibility, for example, in the case of outage of individual processing apparatuses or processing lines.

In the case of the preferred determining or changing of the assignment, various assignment parameters can be taken into consideration—in particular just as in the original (first) assignment—which parameters contain or reflect in particular the availability and capability of individual processing apparatuses and/or processing lines and/or processing times, processing sequences, and/or other processing requirements.

In the case of the scheduling, characteristics or priorities, such as requirements with respect to processing accuracy, processing time, tool availability or other capabilities or the like, can also be taken into consideration by the respective processing apparatus and/or by corresponding interventions or comments, for example, the (central) system control or a central line control of the respective processing line.

The assignment of already assigned lenses can be examined and optionally changed after or before each processing task or each time before an already assigned lens is conveyed, thus can be replaced by a new assignment. Also, in this examination of the assignment and optional change, maintenance that is outstanding or to be expected and/or downtimes and/or other assignment parameters, in particular in the already-mentioned meaning, can again be taken into consideration.

The proposed determination of the assignment or the change thereof—i.e., new assignment—is conducive to an optimal utilization of the system or the processing lines or processing apparatuses and/or especially efficient processing, since in particular even in the case of manufacturing conditions and boundary conditions that change highly dynamically, a quick reaction in terms of a self-correction of the entire facility is made possible or at least supported to ensure quick discovery of an optimum, for example, with respect to resource utilization.

A proposed system is distinguished in particular by a system control, which is designed in such a way that the assignment is determined or changed while taking into consideration maintenance that is outstanding or to be expected or associated downtimes. The transport system or transfer system then conveys the lenses to the processing lines or processing apparatuses corresponding to the assignment. In this connection, in turn corresponding advantages are achieved, as in the above-mentioned methods.

It is generally noted that preferably multiple processing steps (various processing tasks) are necessary in order to manufacture a processed or finished lens from a blank, wherein the sequence of processing tasks preferably is determined in a so-called processing plan.

In the case of multiple processing apparatuses for the same processing task, for example, for polishing, the selection of the processing apparatus that is in each case actually to be used can be done autonomously or independently, in principle, for example, based on availability and/or maintenance that is due or planned or by the respective processing apparatus.

The optional independent processing by the processing apparatuses is preferably defined in such a way that the processing in the respective apparatus proceeds independently from other processing tasks and independently from the transfer system. The sequence of the necessary processing tasks of a lens is and always remains pre-set or retained, even when these processing tasks are carried out in various processing systems and optionally even various production lines without previous scheduling or assignment of the individual processing apparatuses for the individual processing tasks.

The actual processing state is reflected in the processing status, which indicates in particular which processing task has already been done or will be done next, wherein this is especially preferably carried out with reference to the corresponding processing plan for the respective lens.

As an alternative or in addition, the optional independent processing task is preferably defined by the processing apparatuses in such a way that the processing apparatuses can automatically and/or independently select and/or request lenses that are to be processed from a central control system—especially and in particular also preferably taking into consideration the required processing tasks.

The above-mentioned selection can selectively be carried out on a logical level or on a physical level. With the selection on the logical level, the respective processing apparatus can select, for example, a job or a data set with information on a lens that is to be processed from a data storage unit, database server, a system control or the like, and can then convey this lens or the corresponding carrier with this lens to itself.

In the case of selection on the physical level, a processing apparatus can detect or identify, for example, lenses that are to be processed or their carriers—in particular by means of a sensor or the like—and (can) select a suitable lens taking into consideration the respective job or data set with information for the required processing tasks, and the lens can be conveyed for processing. In this connection, an at least largely autonomous processing of lenses by the individual processing apparatuses is achieved, so that in particular in the case of the extension of facilities, an otherwise required, very expensive reprogramming or new programming of central control systems can be completely omitted or at least minimized.

A preferred aspect of this invention thus lies, in particular, in the fact that the processing apparatuses operate at least as much as possible largely automatically or independently, so that especially preferably, the processing apparatuses fetch or request individual lenses from the transfer system in order to perform a required processing task, and then the processed lenses again to the transfer system, i.e., fed back into the conveying or the delivery circuit. This autonomy or independence of the processing apparatuses significantly simplifies the incorporation of additional or new processing apparatuses into the system.

In the case of an independently-operating processing apparatus in the above-mentioned sense, for system optimization, an important issue is who gives the command that a new lens has to be requested or loaded up, and who (ultimately) determines or changes the assignment of which lens from which processing apparatus is processed (next). Preferably or according to the proposed solution, the (central) system control and/or the processing line is provided and/or designed for this (ultimate) determination and/or a change that is carried out (only if necessary).

In general, the (central) assignment of the lenses to be processed to the respective production line is carried out according to the proposed solution. The assignment of a lens to be processed to a processing apparatus and/or the request of the lens by a processing apparatus is then done preferably (only) by the individual processing apparatus, thus preferably independently of the state and/or the availability of other processing apparatuses, wherein in this connection, naturally, the respective requirements for the upcoming processing are taken into consideration.

Should, for example, a processing apparatus not operate with sufficient processing quality (at this time) or should it first undergo maintenance or be scheduled or blocked for maintenance, this would be communicated preferably centrally from the system control or processing line of the respective processing apparatus (in general, i.e., without reference to an actual lens to be processed), so that the processing apparatus in the individual case then does not request any lens to be processed or requests only one lens, which can also actually be processed in the processing apparatus.

The processing apparatus preferably also communicates its status in each case, in particular whether a maintenance is due or is carried out, to the system control and/or processing line.

Especially preferably, an assignment of lenses to a processing line is not changed as long as the processing line as a whole is not overloaded. Within the processing line, the jobs and/or processing tasks are preferably properly organized, distributed in a self-organized manner and/or automatically requested and executed by the processing apparatuses of the processing line. This is possible until, for example, a processing apparatus is off due to a required maintenance or for other reasons or is no longer available for the (required) processing tasks, so that now the remaining lower capacity limit of the processing line is achieved (more quickly) and/or an outage of the processing line as a whole makes necessary a change in the assignment to another processing line.

Preferably, it is provided that when a processing apparatus is off, for example, because of a required maintenance, the processing apparatus initiates an examination of the assignment, in particular by transmission of corresponding status information or an initiation signal to the system control or processing line.

In general, it is noted that a notification to the processing line or a notification from the processing line in particular is defined in such a way that it is communicated with a control of the processing line, even when this preferably provided control of the processing line is not explicitly named.

According to the proposed solution, an especially efficient combination of a central control for the assignment to a processing line, on the one hand, and a decentralized control or organization of the job execution by the individual processing apparatuses, on the other hand, is made possible, wherein the individual processing apparatuses in particular need not communicate among one another. This allows for a simple and very easily adaptable structure.

In the case of a system with multiple, preferably independently-operating, processing lines, it is advantageous for system optimization or it is provided to examine and optionally to adjust or to change—thus, in particular, to replace with a new assignment—the assignment of lenses to a specific processing line before the actual conveying to this processing line is and/or when a new job or a new lens is detected. In this case, in particular, new or current information (assignment parameters), such as the availability of, for example, specific processing tasks or overloading or the failure of a processing line or of specific processing apparatuses and/or servicing that is due, to be expected and/or current, can then also be taken into consideration, in particular in order to make possible or to ensure efficient processing and/tasks or quick or economical processing tasks.

The alternative or additionally provided central management of jobs for processing lenses or eyeglass lenses is correspondingly advantageous, wherein the jobs are selectively forwarded to a sub-system from multiple sub-systems at various sites, taking into consideration in particular assignment parameters, which also take into consideration in particular the availability of corresponding blanks, processing capacities and capabilities. At the corresponding sub-system, the job-specific processing in particular of a blank that is already present there can then be carried out in a desirable way. The (finished) processed lens, in particular the eyeglass lens, can then be sent off, for example, to the delivery address. In this way, in addition to an optimal utilization, even very short delivery times can be achieved, since, for example, different availabilities, in particular also based on different time zones of the various sites, of the sub-systems can be taken into consideration.

The above-mentioned and subsequent aspects and features of this invention can be combined with one another as desired, but also can be implemented in each case independently of one another.

Other aspects, features, advantages and properties of this invention will be apparent from the subsequent description of preferred embodiments based on the drawings.

DETAILED DESCRIPTION OF THE INVENTION

In the figures, the same reference numbers are used for the same or similar components and apparatuses, wherein the same or corresponding advantages and properties are achieved, even when a repeated description is omitted.

Figure 1:
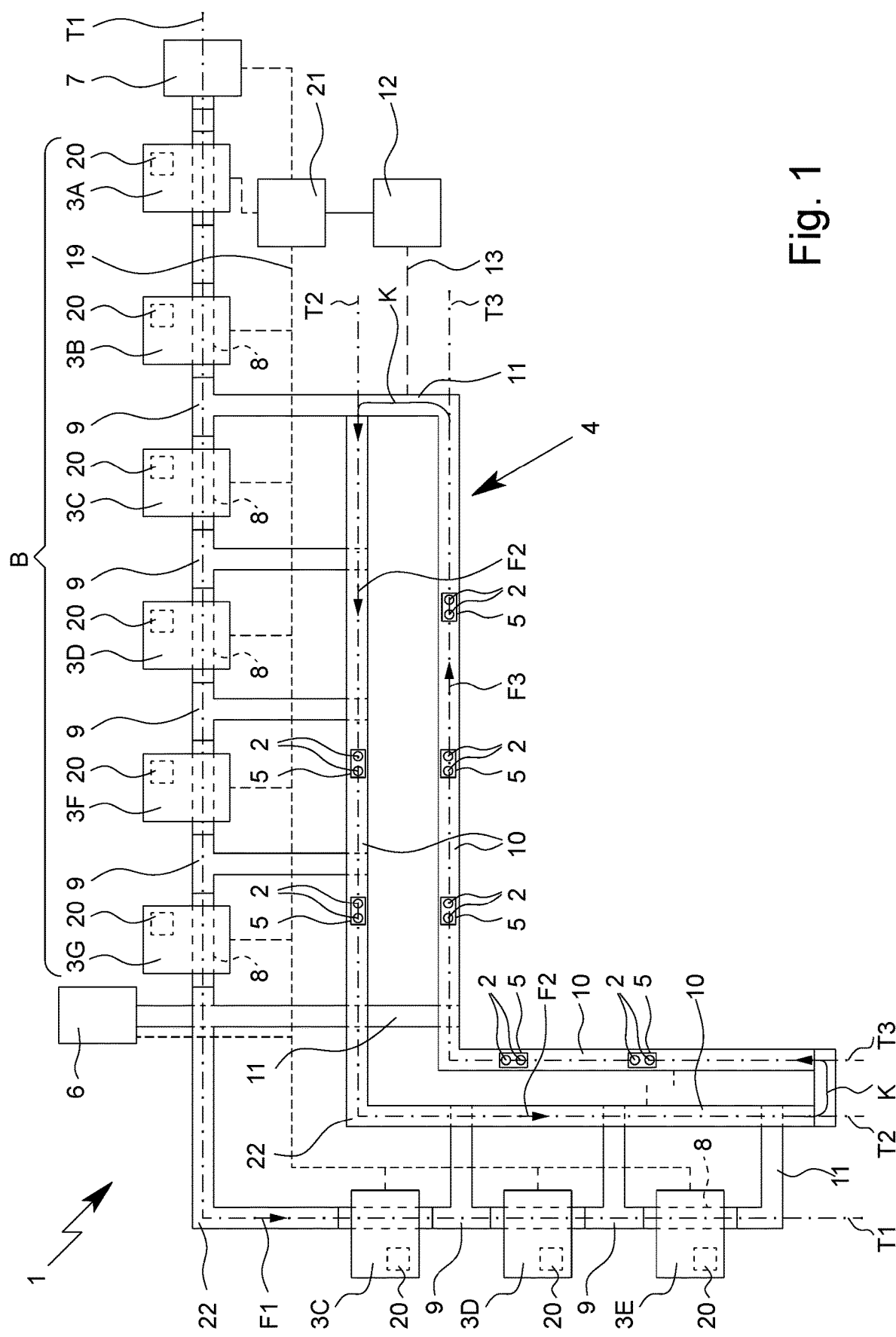
FIG. 1 is a schematic depiction of a proposed system with multiple processing systems.

In a schematic depiction, FIG. 1 shows a proposed system 1 for processing optical lenses 2, i.e., a lens-processing installation. Subsequently, as an especially preferred embodiment, more detailed discussion will focus primarily on the processing of lenses for eyeglasses or eyeglass lenses. Preferably, however, these explanations correspondingly also apply for the processing of other lenses 2 or in general optical workpieces.

The system 1 has multiple separate processing apparatuses 3 for independent processing of lenses 2. For example, the system 1 can have in particular at least one processing apparatus 3A for blocking (temporary connection with a holder) of lenses 2, a processing apparatus 3B for intermediate storage of lenses 2 (preferably for cooling after blocking), a processing apparatus 3C for shaping, in particular machining or milling of lenses 2, a processing apparatus 3D for polishing lenses 2, a processing apparatus (measuring apparatus) 3E for testing or measuring lenses 2, a processing apparatus 3F for marking lenses 2 and/or a processing apparatus 3G for coating lenses 2.

If necessary, multiple similar processing apparatuses 3, for example, two or more processing apparatuses 3, can also be present or integrated into the system 1 for the same processing tasks. For example, multiple processing apparatuses 3C can be provided for shaping processing tasks, multiple processing apparatuses 3D for polishing, etc. This depends in particular on the throughput of the various processing apparatuses 3 and/or the desired processing tasks.

A special advantage of the proposed system 1 is that additional processing apparatuses 3 can also later, if necessary, be very easily integrated or incorporated into the system 1 at a later time, if necessary, and extensions can thus very easily be carried out.

The system 1 preferably has a transfer system 4 for transport of the lenses 2 and/or of lens carriers 5 with the lenses 2 to and from the processing apparatuses 3. The transfer system 4 feeds the lenses 2 or lens carriers 5 (cf. FIG. 2) in particular to the processing apparatuses 3 and/or transports or conveys the lenses 2 or lens carriers 5 after a processing has been carried out in a processing apparatus 3 to another processing apparatus 3 or to a handoff 6, as indicated in FIG. 1. The handoff 6 can comprise, for example, a transfer apparatus, a rolling table and/or other storage apparatuses or can be formed therefrom.

In addition to the handoff 6, the system 1 preferably also has an intake 7, which serves to accommodate lenses 2 that are to be processed and/or that are from lens carriers 5 that carry the lenses 2 that are to be processed.

Preferably, a separate conveying apparatus 8 for in particular linear conveying of at least one lens 2 or one lens carrier 5 is assigned to each processing apparatus 3. In particular, the assigned conveying apparatus 8 is integrated or incorporated into the respective processing apparatus 3 or is attached to the latter. The conveying apparatus 8 is preferably designed as a conveyor belt.

The conveying apparatuses 8 of the processing apparatuses 3 are preferably controlled in each case by the respective processing apparatus 3 or the machine control system 20 thereof.

Figure 3:
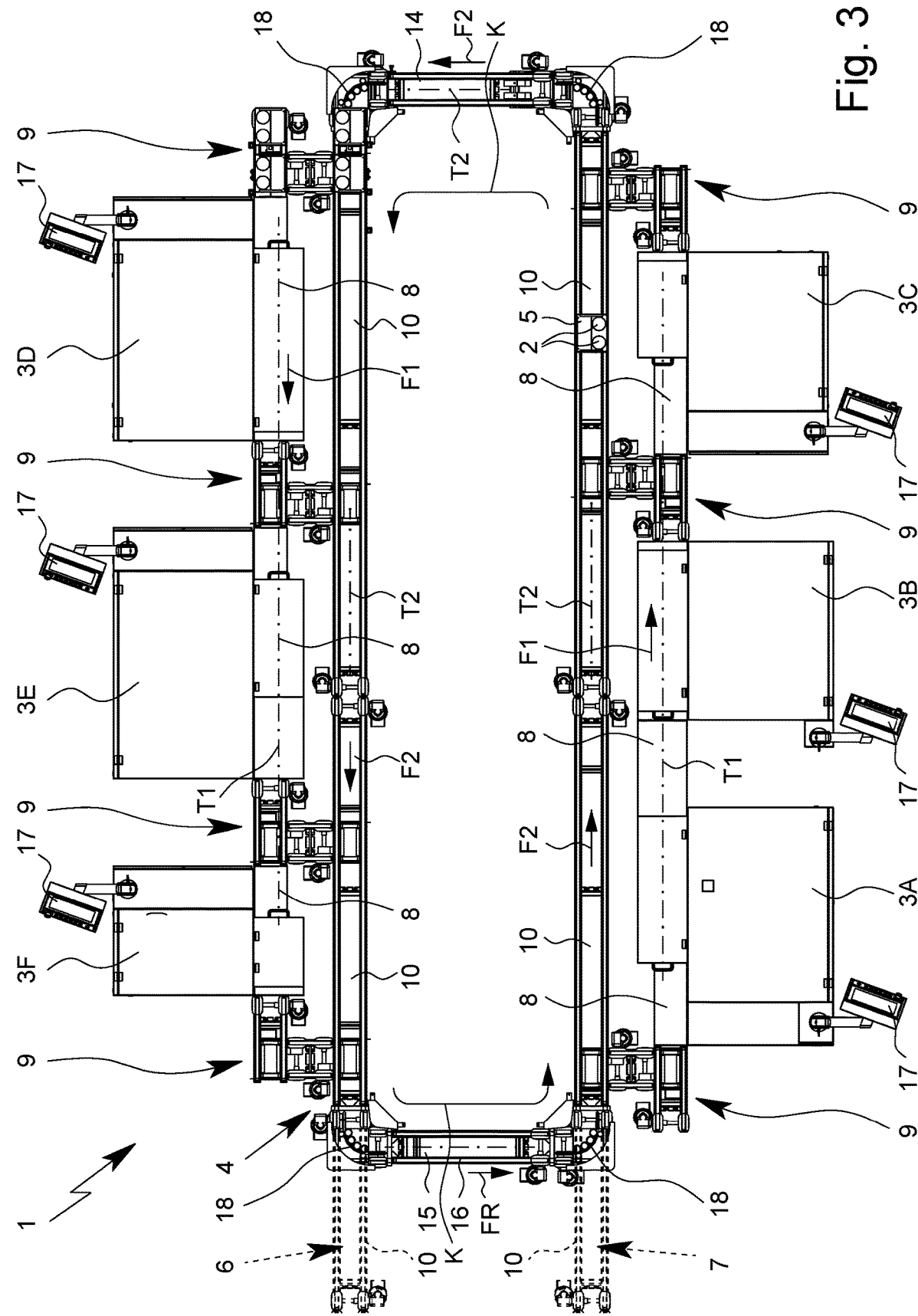
FIG. 3 is a schematic depiction of the proposed system according to another embodiment.

Especially preferably, the processing apparatuses 3 in each case have a control console or operating console 17 (indicated in FIG. 3).

The processing apparatuses 3 are preferably arranged or set up beside one another so that the conveying apparatuses 8 run at least essentially in a line and/or are behind one another and/or form a first transport track T1 that is at least essentially in a straight line (indicated in dashed-dotted lines in FIG. 1).

The transfer system 4 preferably has transfer apparatuses 9, which in each case are arranged between two adjacent processing apparatuses 3 (of a series). Preferably, transfer apparatuses 9 are arranged between some or all (directly) adjacent processing apparatuses 3 or conveying apparatuses 8 thereof.

The transfer apparatuses 9 are preferably in each case designed for accommodating—and in particular for temporary intermediate storage of—at least one lens 2 or one lens carrier 5 and/or for further conveying, if necessary, of these lenses 2 or this lens carrier 5 selectively to the conveying apparatus 8 of a subsequent processing apparatus 3 or to a second transport track T2 of the system 1 or the transfer system 4.

The second transport track T2 preferably also runs like the first transport track T1 at least essentially in a straight line or like a polygon and/or parallel to the first transport track T1.

The conveying direction of the first transport track T1 is indicated in FIG. 1 by an arrow F1. The second transport track T2 preferably conveys in the same direction, as indicated by arrow F2.

The second transport track T2 is used in particular in such a way that lenses 2 or lens carriers 5 can be conveyed past individual processing systems 3.

For example, such a conveying-past for better utilization of processing systems 3 can be desirable or necessary for conveying to a specific processing system 3 for special processing tasks, for example, based on a failure or a utilization of a processing system 3 or based on unnecessary processing tasks by a processing system 3. As an alternative or in addition, the conveying-past can also serve to refit other lenses 2 or lens carriers 5, for example, when a primary processing of a specific lens 2 or multiple specific lenses 2 is to take place.

Preferably, the lenses 2 or lens carriers 5 can switch between the first and second transport tracks T1, T2 by means of the transfer apparatuses 9. In particular, such a switching between any of the processing apparatuses 3 and/or by means of any transfer apparatus 9 and/or in any direction, i.e., from the first to the second transport track T1, T2 and vice versa, is possible.

The system 1 and/or transfer system 4 optionally has a third transport track T3, which preferably runs at least essentially in a straight line and/or parallel to the other transport tracks T1 and T2.

The conveying direction F3 of the third transport track T3 is preferably directed opposite to the conveying directions F1 and F2 of the other transport tracks T1 and T2 or preferably runs backwards. The transport track T3 thus is used in particular for rearward conveying or reverse conveying of lenses 2 or lens carriers 5 and/or for a circular conveying K, for example, for feeding back (via corresponding switching possibilities) into the first or second transport track T1, T2 for another type of processing or optionally for rearward conveying to the handoff 6.

The system 1 or transfer system 4 preferably has conveying apparatuses 10 and/or switching apparatuses 11, in particular together with the conveying apparatuses 8 and transfer apparatus 9 to form the first, second and/or third transport tracks T1, T2, T3.

The conveying apparatus 8, the transfer apparatus 9, the conveying apparatuses 10 and/or the switching apparatuses 11 are preferably designed as belt conveyors.

The third transport track T3 is preferably built correspondingly or similar to the second transport track T2, especially preferably from multiple conveying apparatuses 10 that are arranged in a line or one behind another.

The transfer apparatuses 9 and/or conveying apparatuses 10 of the second and/or third transport track T2, T3 can preferably be controlled or driven independently of one another, so that an independent conveying of lenses 2 or lens carriers 5 is possible along the first, second and/or third transport track T1, T2, T3, and/or a switching between the transport tracks T1, T2, T3 is possible.

As an alternative or in addition to the different control of transfer apparatuses 9, conveying apparatuses 10 and/or switching apparatuses 11 and/or to a rearward conveying, a halting of individual lenses 2 or lens carriers 5 can also be realized by corresponding stopping apparatuses or the like (not shown).

The switching apparatuses 11 and the transfer apparatuses 9 can also be combined and/or arranged in extension and/or can form a subassembly, as indicated by way of example in FIG. 1 on the righthand side.

Preferably, the system 1 in the area of one end or the handoff 6, in particular when the latter is physically separated from the intake 7, has an assigned transfer apparatus 9 and/or switching apparatus 11, as indicated in FIG. 1.

Preferably, one or more switching apparatuses 11 are arranged in the area of the beginning and the end of the second or third transport track T2, T3 and/or between them, in particular to make possible a circuit or a circulation or a circular conveying K of lenses 2 or lens carriers 5.

The system 1 and/or the transfer system 4 preferably has a transfer control or control apparatus 12—in particular a memory-programmable control or HMI (human-machine interface)—for controlling the transfer system 4 and/or the transfer apparatuses 9 and/or conveying apparatuses 10 as well as, if present, the switching apparatuses 11 and optionally the intake 7 and/or handoff 6. The connection is especially preferably made via a bus system 13.

A common or central control of the transfer system 4 is preferably thus carried out. The conveying apparatuses 8 that are assigned to the processing apparatuses 3 preferably do not form any part of the transfer system 4 or the transfer control, however. Instead of this, the conveying apparatuses 8 of the processing apparatuses 3 are preferably controlled by the processing apparatuses 3 themselves or directly, or by their machine controls 20. The conveying apparatuses 8 are accordingly preferably connected in each case to the assigned processing apparatus 3 or the machine control 20 thereof for controlling the respective conveying apparatus 8.

Instead of the lens carrier 5 that is described here, however, another holder can also be used for a lens 2 or multiple lenses 2.

The system 1 preferably has the central facility or system control 21. Preferably, one or more or all processing apparatuses 3 or machine control systems 20 thereof are connected thereto, for example, via a data network, an (additional) bus system 19, Ethernet wiring or the like.

According to an especially preferred aspect of this invention, circulation or circular conveying K of the lenses 2 or lens carriers 5 can be carried out. This can make possible in particular a storage of lenses 2 or lens carriers 5 and/or can prevent or minimize the formation of undesirable blockages. In particular, the lenses 2 or lens carriers 5 are—as needed and/or depending on availability—discharged or conveyed to desired processing apparatuses 3. This is carried out in particular by corresponding crosswise conveying and/or a switching to the first transport track T1 or to a transfer apparatus 9 that is assigned to or arranged upstream of the desired processing apparatus 3.

In particular, it is possible that in the case of the circulation or circular conveying K, multiple lens carriers 5 may circulate or are conveyed in a circuit, for example, until the next or a desired processing apparatus 3 is ready for receiving or being fed for the appropriate processing task.

In the case of the system control 21, this can be a server, a database system, or the like.

The system control 21 manages in particular the jobs that are to be executed by the system 1 and/or the lenses 2 that are to be processed by the system 1 and/or the information that is necessary for the processing, for example, processing data, processing plans or processing sequences, processing status, planned or required processing steps, optical and/or geometric information or data of the lenses 2 and/or other information, for example, via tools that are available or are to be used, or the like.

Preferably, the transfer control or control apparatus 12, on the one hand, and the system control 21, on the other hand, are coupled to one another for information and/or data exchange, as schematically indicated.

Preferably, the system control 21 can control the transfer system 4 and/or the transfer apparatuses 9, conveying apparatuses 10 and/or switching apparatuses 11 in particular via the control apparatus 12 in such a way that desired lenses 2 or lens carriers 5 are conveyed to the respective processing apparatuses 3, if necessary only upon the corresponding request of the respective processing apparatus 3.

In particular, various or all processing apparatuses 3 can automatically request or fetch individual work orders or lenses 2 that are to be processed or lens carriers 5 with lenses 2 to be processed automatically from the transfer system 4, can perform the respective required processing, and after the processing can feed the lenses 2 back again to the transfer system 4 or can deliver the lens to the transfer system 4.

The fetching or requesting of lenses 2 for processing by one or more or optionally all processing apparatuses 3 is thus preferably carried out automatically and/or independently. In particular, a processing apparatus 3 can automatically determine—in particular taking into consideration a processing plan and processing status (these processing data or this information is/are queried or provided in particular by the system control 21 or a database, a data storage unit, or the like)—whether a lens 2 (in particular located near or just ahead of the processing apparatus 3) is suitable for processing in the respective processing apparatus 3 in order to be able to request said lens or the corresponding lens carrier 5 in the case of the corresponding capacity of the processing apparatus 3.

In particular, multiple processing apparatuses 3 can thus select and/or request—for the same processing task, independently of one another—a lens 2 for the next processing. In the illustrative example, the request is made by a processing apparatus 3, in particular when the load has been removed from the latter. If necessary, the request can also already be made in advance, however, for minimizing the waiting period. Then, in the meantime, the next lens 2 that is to be processed or the corresponding lens carrier 5 can in particular already be conveyed to the transfer apparatus 4 that is upstream from the processing apparatus 3 or can be accommodated by said transfer apparatus and held there until the processing apparatus 3 is ready to receive the next lens 2 or the next lens carrier 5.

Preferably, the respective processing apparatus 3 delivers a corresponding piece of information or a corresponding signal to the control apparatus 12, when a lens 2 or a lens carrier 5 is to be handed off or has already been handed off after the processing to the downstream transfer apparatus 9 or to the transfer system 4. Depending on the capacity, the respective lens 2 or the respective lens carrier 5 is then accommodated by the transfer system 4 or the transfer apparatus 9 that is downstream from the respective processing apparatus 3, for example, in an intake area, and/or further conveyed, for example, to a downstream processing apparatus 3 and/or fed back into the second transport track T2 or the circular conveying K. This can selectively be carried out by the transfer system 4 or the control apparatus 12 thereof independently and/or in coordination with and/or based on the system control 21.

In addition, a lens 2 or a lens carrier 5 is then again conveyed to the processing apparatus 3 that is ready for receiving a lens 2 or a lens carrier 5, wherein the selection—as already mentioned—is carried out especially preferably by the respective processing apparatus 3 or the machine control 20 thereof and/or by the system control 21, especially preferably taking into consideration data that is relevant for the processing, such as the processing plan and processing state, in particular from the system control 21. The control of the conveying is then preferably carried out via the control apparatus 12, but it can, if necessary, also be controlled by the respective processing apparatus 3 or the machine control 20 thereof.

As an alternative or in addition, when lenses 2 or lens carriers 5 are conveyed and removed or when the upstream and/or downstream transfer apparatus 9 is activated, the respective processing apparatus 3 can take precedence, for example, over a downstream or upstream processing apparatus 3 and/or over the transfer control or control apparatus 12.

Especially preferably, after the processing, a processing apparatus 3 or the conveying apparatus 8 thereof delivers a lens 2 or a lens carrier 5 to the transfer system 4 or to a transfer apparatus 9—preferably downstream in the conveying direction F1—if or as soon as space for accommodation is available there. To this end, the processing apparatus 3 or the machine control 20 thereof preferably communicates via the system control 21 or directly to the transfer control or control apparatus 12 or to the transfer system 4 or the respective transfer apparatus 9.

After the processing apparatus 3 or the conveying apparatus 8 thereof is freed up, the latter can accommodate the next lens 2 or the next lens carrier 5 again. The conveying is done in particular via the transfer system 4 or the upstream transfer apparatus 9. The initiation of the conveying is done preferably by a request of the respective processing apparatus 3 or by the system control 21 when the latter has become recognized or communicated, so that the load has been removed from the processing apparatus 3 or the conveying apparatus 8 thereof has been freed up.

It is noted that the conveying apparatuses 8 of the processing apparatuses 3 can accommodate if necessary (simultaneously) in particular also multiple lenses 2 or lens carriers 5 with lenses 2. The term "freed up" is then correspondingly defined to the extent that the respective processing system 3 or the conveying system 8 thereof is ready to accommodate a lens 2 or a lens carrier 5, even when there are still one or more lenses 2 or lens carriers 5 in the processing apparatus 3 or the conveying system 8 thereof.

The system 1 or the processing apparatuses 3 preferably forms or form a processing line B, in particular together with the transfer apparatus 4, in order to process the lenses 2. The processing line B runs in particular in a straight line, but can also have any other arrangement, in particular depending on the formation of the transport tracks T or configuration of the transfer system 4. In particular, for example, a corner arrangement is possible, as indicated in FIG. 1.

Figure 2:
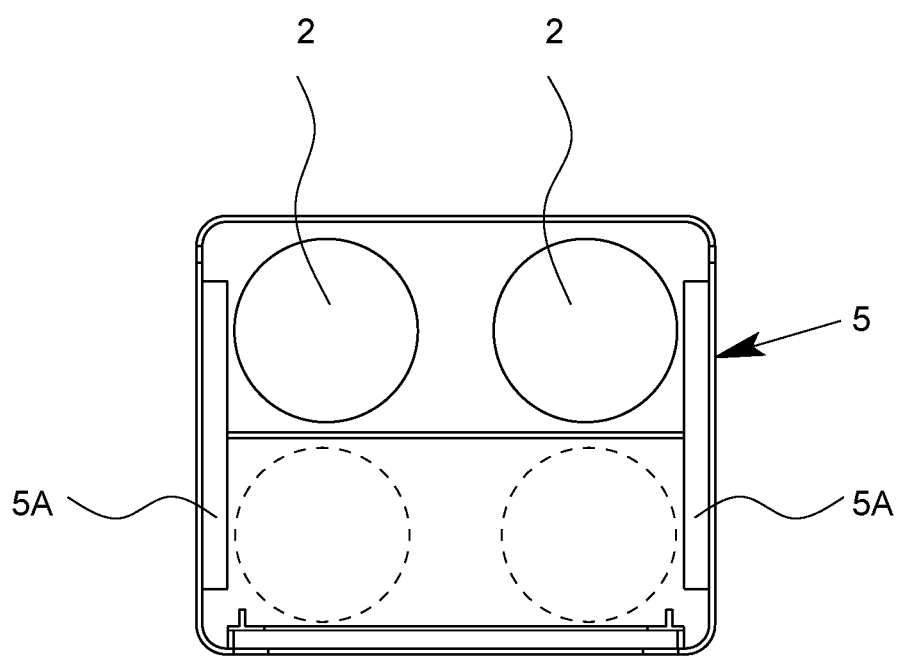
FIG. 2 is a schematic depiction of a lens carrier with lenses that are to be processed.

In a schematic top view, FIG. 2 shows a preferred embodiment of a lens carrier 5 for accommodating at least one, in the illustrative example in particular two or more, of the lenses 2 that are to be processed. For the lens processing or eyeglass-lens processing, usually two lenses 2 that are to be processed or one pair of lenses is/are picked up from a lens carrier 5. This is also preferred here.

The lens carrier 5 preferably has a coding 5A, for example, a bar code or the like, with important processing data, data for identification and/or other information for both lenses 2 or a separate coding 5A for each lens 2, as indicated in FIG. 2. The coding 5A especially preferably contains an identification or job number or the like for the respective lens(es) 2, so that by means of the identification or job number, a processing plan and/or processing status or required processing steps, processing sequences, processing data and/or other information can be determined or retrieved therefrom, for example, via a corresponding server system, database system or the like, in particular a system control 21, as indicated in FIG. 1.

In general, it is noted that processing without block pieces can also be carried out. In the illustrative example, however, the respective lens 2 is preferably connected or at least at this time is still connected temporarily to an assigned holder or block piece (not shown), in particular in the processing apparatus 3A. By means of this holder or block piece, the respective lens 2 is then preferably held or positioned in each case in the further processing tasks or in other processing apparatuses 3.

Below, based on the other figures, first further embodiments of the proposed system 1 are explained. In this connection, in particular significant differences and new aspects are discussed in more detail in each case, so that the previous embodiments and explanations apply in particular correspondingly or in supplementation, even when this repetition is omitted.

In a schematic depiction, FIG. 3 shows another embodiment of the proposed system 1. In this embodiment, preferably a ring arrangement or an at least essentially U-shaped arrangement, in particular of the first or second transport track T1 or T2, is formed.

Preferably, two groups or series of processing apparatuses 3—here, for example, a first group of processing apparatus 3A, 3B and 3C and a second group of processing apparatuses 3D, 3E and 3F—are formed or arranged opposite to one another and/or with conveying apparatuses 8 arranged on sides facing one another, and/or are arranged in such a way that the assigned transport tracks T1 and/or T2 of the two groups preferably run parallel to one another.

The system 1 and/or transfer system 4 preferably has a corresponding crosswise connection of the two groups of the processing apparatuses 3 via a conveying system 14 and/or 15.

The conveying apparatus 14 preferably forms a leg or section of the preferably at least essentially U-shaped arrangement or a part of the preferably essentially U-shaped course of the first or second transport track T1 or T2, here the second transport track T2. If necessary, one or more processing apparatuses 3 can also be arranged in this section.

The system 1 and/or transfer system 4 preferably has a rearward conveying connection 16 The rearward conveying connection 16 preferably has the conveying apparatus 15 or is thus formed therefrom.

Preferably, in the depicted embodiment, circulation or circular conveying K is possible especially preferably via the first or second transport track T1 or T2. In the embodiment, to this end, the rearward conveying connection 16 is provided for the first or second transport track T1 or T2 (in the illustrative example, only for the second transport track T2). Here, the rearward conveying connection 16 makes possible a rearward conveying in the rearward conveying direction FR, so that the circular conveying K of the lenses 2 or lens carriers 5 is made possible via the second transport track T2 without reversing the conveying direction F2 and without switching to the reverse conveying direction F3.

In the depicted embodiment, the system 1 and/or the transfer system 4 preferably has an intake 7 and/or handoff 6 and/or corresponding conveying apparatuses 10 (indicated in dotted lines on the left side in FIG. 3) as an inflow zone and/or outflow zone for lenses 2 or lens carriers 5.

The rearward conveying connection 16 and/or conveying apparatus 15 is especially preferably arranged in the area of the beginning and/or the end of the transport track T1 or T2 and/or the usual processing and/or in the area of the intake 7 or handoff 6. Especially preferably, the rearward conveying connection 16 and/or conveying apparatus 14 is connected via corresponding track switches. However, other constructive solutions and/or arrangements are also possible; in particular, they depend on position and design or arrangement of the intake 7 and/or handoff 6.

In the embodiment according to FIG. 3, the rearward conveying connection 16 makes possible the circular conveying K or circulation of the lenses 2 or lens carriers 5. Accordingly, a third transport track T3 for rearward conveying or circulation is not necessary. However, the rearward conveying connection 16 and the third transport track T3 can, if necessary, also be combined or used in supplementation, in particular according to structural circumstances and/or existing processing apparatuses 3.

The rearward conveying connection 16 can, if necessary, also be arranged at another site or form only one circuit for some of the processing apparatuses 3; for example, it can be connected, on the one hand, between the processing apparatuses 3B and 3C, and, on the other hand, between the processing apparatuses 3D and 3E; if necessary, it thus also can form or make possible a shorter or smaller circuit.

If necessary, multiple such crosswise connections and/or rearward conveying connections 16 can also be or are provided. In this way, if necessary, additional storage tracks can also be formed.

The system 1 and/or the transfer system 4 preferably has conveying apparatuses 18 for curved conveying, in particular to connect straight sections of the respective transport track, here T2, and/or different conveying apparatuses 10, 14 and/or 15 and/or the rearward conveying connection 16 to the transport track T2. It can be achieved—by the curved conveying—that the orientation of the lenses 2 or lens carriers 5 relative to the respective conveying direction F remains the same, thus, for example, in the case of a lens carrier 5 with two lenses 2, the same lens 2 is always in front.

In the illustrative example, the two groups of processing apparatuses 3 or the two legs of the especially preferred U-shaped arrangement are preferably arranged relatively close to one another and/or are spaced in such a way that the intermediate space provides an access option for an operator, not shown. In particular, to this end, the crosswise connections and/or conveying apparatuses 14 and/or 15 are designed in such a way that they, if necessary, can be released or opened or folded away. As an alternative or in addition, they can also be located higher or lower and, for example, can be connected via corresponding vertical conveyors or inclined tracks or chutes, so that preferably free access to the intermediate space is made possible.

As an alternative or in addition, the intermediate space can also be used for containers for operating means for processing apparatuses 3, for example, for a coolant container, a container for shavings, a container for refrigerant, or the like. The containers can be arranged in particular in the intermediate space and/or below the transfer system 4, especially preferably below the second transport track T2.

Figure 4:
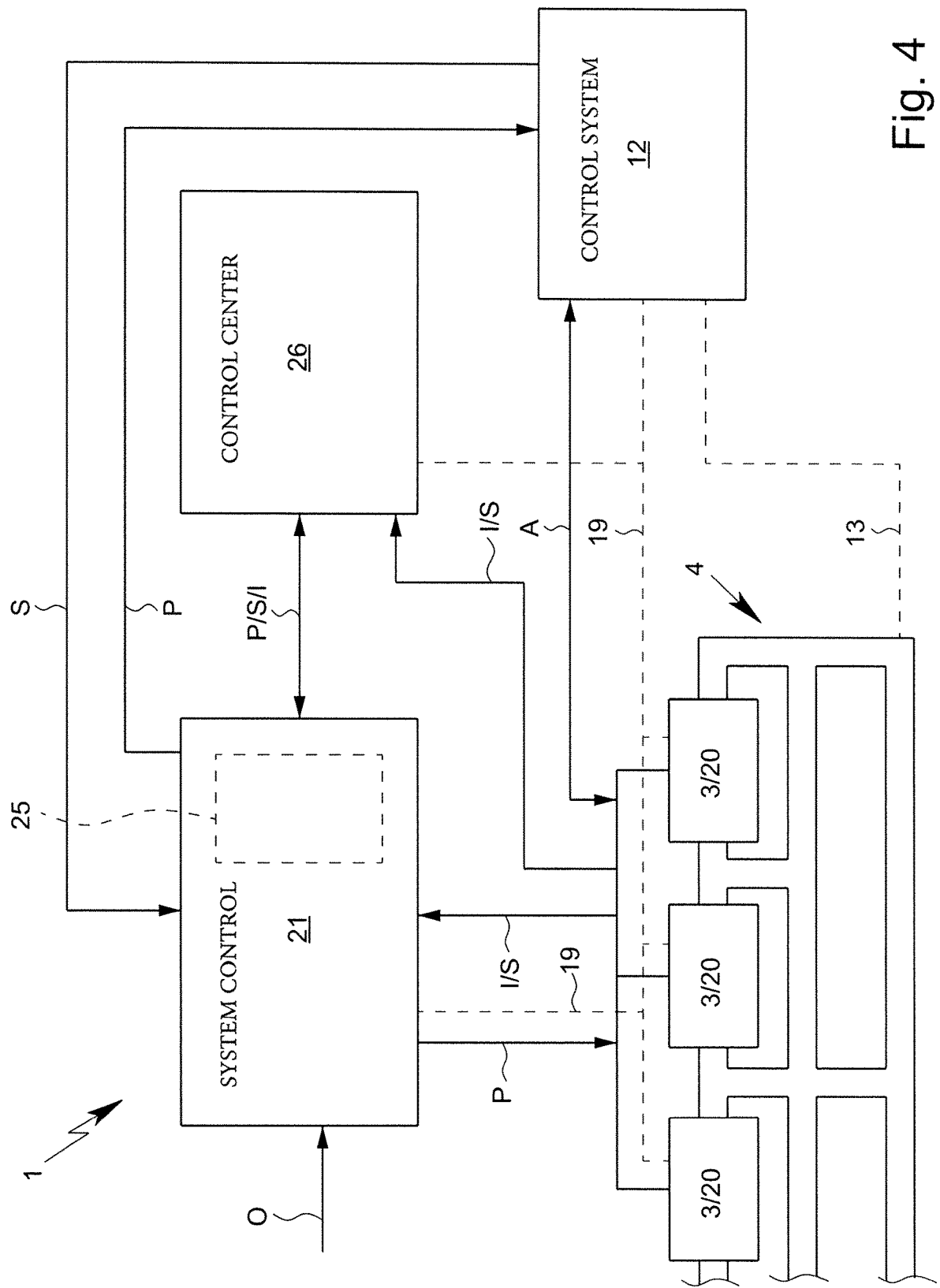
FIG. 4 is a schematic block diagram of a preferred control structure of a proposed system.

In a very schematic depiction, FIG. 4 shows a block diagram of a preferred control structure of a proposed system 1.

As already mentioned, the system 1 and/or the transfer system 4 preferably has in particular the central transfer apparatus or control apparatus 12. In this case, this is in particular a so-called belt-control computer. If necessary, this can also be a program and/or multiple networked computers, data processors, control apparatuses, or the like.

The transfer or control apparatus 12 is used in particular in the control of the production flow and/or the conveying of lenses 2 or lens carriers 5, such as the circulation or circular conveying K and/or conveying of lenses 2 or lens carriers 5 to the processing apparatuses 3 and away from the latter.

Especially preferably, the control apparatus 12 controls the transfer apparatuses 9, conveying apparatuses 10 (and optionally 14 and 15, if present) and/or switching apparatuses 11, wherein the transfer apparatuses 9 preferably can be (directly) controlled in supplementation or as an alternative also by the processing apparatuses 3 or machine control 20 thereof—in particular when connected to the bus system 13.

The facility or system control 21 is preferably coupled or connected via the (additional) bus system 19 to the processing apparatuses 3 or machine controls 20 thereof. However, other types of connections are also possible here.

The control apparatus 12 can also be connected to the system control 21 via the bus system 19 or a separate connection for data exchange.

The control apparatus 12 can also optionally be formed by the system control 21 or integrated into the latter. The system control 21 preferably forms a lens management system and/or a facility control. The system control 21 is used in particular for accepting or detecting jobs O and/or managing jobs O, production data P and/or lens blanks and/or the allocation of interfaces to other systems, for example, to systems or modules for the lens design, which determine the desired geometric configuration of lenses 2 and/or the required processing tasks or processing steps in particular based on desired optical properties.

In particular, in the system control 21 (or another server or data storage unit), production data P, which contain in particular processing plans (processing steps and/or processing sequences or processing series) and processing status (processing states and/or information on processing tasks that are to be performed next), are managed and/or generated.

The production data P are made available, in particular, by the system control 21 to the processing apparatuses 3 or the machine controls 20 thereof and/or can be checked by the latter, as schematically indicated by a corresponding arrow.

The system 1 and/or the system control 21 preferably has an internal control center 25 and/or an external control center 26. The system control 21 or the control center 25 and/or 26 thereof is preferably used in detection, management, logging, planning, controlling and/or output or display of maintenance, in particular of maintenance that is due or to be expected and/or associated downtimes, of one or more, in particular all, connected processing apparatuses 3 or processing lines B.

The status of the processing apparatuses 3, in particular the processing status or production status, the availability of the respective processing apparatus 3, the capabilities and/or tool configuration, the possible processing tasks and/or other similar information, in particular maintenance that has been carried out, is forwarded for display and/or management as status information S from the processing apparatuses 3 or the machine control 20 thereof, in particular to the system control 21, as indicated by a corresponding arrow in FIG. 4, and/or to the control center 25 and/or 26.

The control center 25 and/or 26 is used in particular in the visualization and/or management of maintenance that is due, in particular already planned or finished, or to be expected, or associated downtimes, as well as machine conditions, i.e., conditions of processing apparatuses 3, production data P, process data and/or other information 1.

The control center 25 and/or 26 is preferably also used to manage macros and/or the reporting system. The control center 25 and/or 26 can be corresponding programs, applications or the like, and/or involve one or more data processors, such as a server or the like. The same is also true for the system control 21 and/or control apparatus 12.

The control center 26 can optionally also be formed by the system control 21 and/or be connected (only) via the latter to the system 1.

The processing apparatuses 3 or the machine controls 20 thereof can preferably also communicate information I, such as process data, and the like, to the control center 25 and/or 26, as indicated by a corresponding arrow.

The control center 25 and/or 26 can also be connected to the bus system 19 for information or data exchange. As an alternative or in addition, the data exchange can also be carried out via the system control 21.

Preferably, the system control 21 and the control center 25 and/or 26 can exchange production data P and/or other data, such as status information S, for example on the job status, as indicated by arrow P/S/I in FIG. 4. Preferably, the system control 21 and the control apparatus 12 can exchange and/or coordinate production data P, as indicated by a corresponding arrow, and/or status information S, in particular data on the job status, as indicated by a corresponding arrow A.

For data exchange, the control apparatus 12 is preferably also connected to the other bus system 19 and/or in some other way or is connected or connectable for the purpose of data exchange. Preferably, the processing apparatuses 3 or the machine controls 20 thereof can exchange job information A, as well as information regarding status, in particular job status, queries and/or requests, as indicated by a corresponding arrow in FIG. 4. Especially preferably, queries and job information A can be forwarded to the control apparatus 12 or communicated to the latter and/or a request for a lens 2 or a lens carrier 5 can be forwarded to the control apparatus 12. As an alternative or in addition, information on lenses 2 or lens carriers 5 that are detected or identified preferably by sensors can be forwarded by sensors directly or via the control apparatus 12 to one or more or all processing apparatuses 3 or the machine control 20 thereof or provided to them. This information exchange is carried out in particular within the scope of the request for new lenses 2 or lens carriers 5 by the processing apparatuses 3, as indicated by the double arrow A in FIG. 4. This information exchange can also be carried out taking into consideration additional data or information, in particular process data P, especially preferably processing plans and processing status, which preferably are provided by the system control 21.

In particular, the processing apparatuses 3 can preferably automatically or independently select and/or request new jobs or lenses 2 for processing. According to an especially preferred aspect, this makes possible virtually any or independent engaging or insertion of processing apparatuses 3 into the system 1.

The proposed system 1 and method for processing optical lenses 2 is very flexible. In particular, an improved or optimized use of processing capacities can be achieved. In addition, a very flexible processing and adaptation to various circumstances is made possible. For example, shutdown times or outages of individual processing apparatuses 3 can be compensated very easily and/or in an optimal way, in particular if other or alternative processing apparatuses 3 are available. As an alternative or in addition, an intelligent center-of-gravity control system can be carried out, for example, to the extent that a processing apparatus 3 that is especially suitable for a specific processing task is used primarily for this processing task, i.e., for example, a lathe with an especially large shaving space for processing especially long or bulky shavings lenses 2 that are being processed for production.

The proposed system 1 and method allow, in particular, a very great flexibility even in the case of the processing of lenses 2 with different shapes and/or that consist of various materials. In particular, the previously common processing lines or manufacturing lines, which are primarily oriented to the processing of lenses 2 made from a specific material or of lenses 2 of a specific shape, can be avoided.

Another embodiment of the proposed system 1 is explained below based on FIG. 5, wherein primarily only essential differences or new aspects are dealt with in more detail, so that the preceding remarks and explanations apply correspondingly or in supplementation, even when this repetition is omitted.

Figure 5:
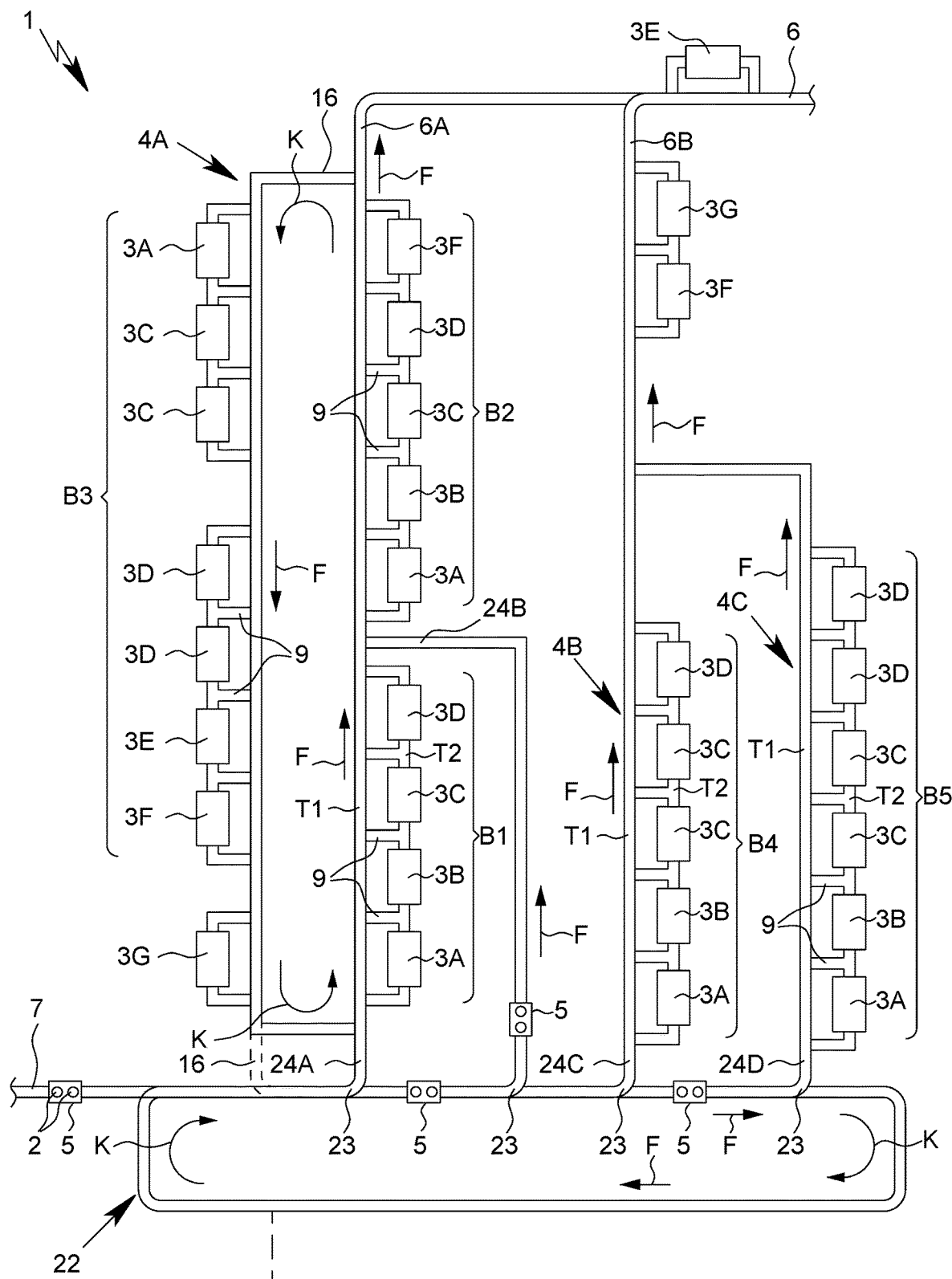
FIG. 5 is a schematic depiction of a proposed system with a transport system and multiple production lines that are connected thereto.

In the embodiment according to FIG. 5, the proposed system 1 preferably has an in particular upstream or central transport system 22 and multiple processing lines B that are connected thereto, here the processing lines B1 to B5. Multiple or all processing lines B in each case have multiple different and/or similar processing apparatuses 3, as indicated by way of example in FIG. 5, in particular different processing apparatuses 3A to 3G in the above-defined sense. For example, the processing line B3 or B5 has multiple processing apparatuses 3, wherein at least two processing apparatuses 3, here two processing apparatuses 3C for shaping processing tasks, for example, by milling and/or turning, and/or two processing apparatuses 3D for polishing.

The lenses 2 or lens carriers 5 are conveyed via corresponding transfer systems 4A, 4B and 4C, which represent in particular in each case a transfer system 4 in the already-described sense, to the processing apparatuses 3 of the processing lines, and they are conveyed away again by said transfer system(s). In particular, the transfer system 4, or here in the illustrative example the transfer system 4A, can be assigned to multiple processing lines B, here to the processing lines B1, B2 and B3, and/or can form a ring arrangement or annular conveying or circular conveying K.

As an alternative or in addition, only one processing line B can also be assigned to each transfer (sub-)system 4. In the illustrative example, (only) the processing line B4 is assigned to the transfer system 4B, and (only) the processing line B5 is assigned to the transfer system 4C.

Especially preferably, the respective processing line B thus also has an assigned transfer (sub-)system 4 and/or upstream transport system 22.

The transport system 22 is upstream from the processing lines B or transfer systems 4 in order to convey, selectively or as required, the lenses 2 that are to be processed or the carriers 5 equipped therewith to the latter—i.e., to the processing lines B and/or transfer systems 4. This conveying follows in particular in accordance with an assignment Z, as indicated by way of example in FIG. 6.

Especially preferably, some or all processing lines B and/or transfer systems 4 are connected via one or more branches 23 and feeds 24, in particular via a branch 23 and a separate feed 24, to the transport system 22, so that the lenses 2 that are to be processed or the carriers 5 equipped therewith can be conveyed preferably separately and/or directly to one or more or all processing lines B.

In the embodiment that is depicted in FIG. 5, for example, the processing lines B1, B2 and B3 and/or the transfer system 4A is/are connected via a branch 23 and the feed 24A as well as via another branch 23 and the feed 24B to the transport system 22. For example, here the processing line B1 can be supplied via the feed 24A, and the processing line B2 can be supplied via the feed 24B, in each case directly with lenses 2 that are to be processed. This direct conveying or supplying of processing lines B is advantageous with respect to an optimized process and/or especially good system utilization and represents an especially preferred, also independently-achievable, aspect of this invention.

In addition, it is also possible, however, that processing lines B are only indirectly connected or are supplied with lenses 2 that are to be processed. For example, here the processing line B3 is connected indirectly via the other processing lines B1, B2 and/or the assigned transfer system 4A and thus has no distinct or separate feed 24.

The processing line B or multiple processing lines B, here the processing lines B1, B2 and B3 or their transfer system 4A, preferably form(s) a ring arrangement and/or make(s) possible a circular conveying K, as already described in other embodiments and as indicated in FIG. 5.

A ring arrangement or circular conveying K is, however, not absolutely necessary, even if the latter is advantageous and/or preferred. For example, in each case, the transfer systems 4B and 4C with the assigned processing lines B4 and B5 do not form any ring arrangement or circular conveying K, but rather other arrangements, here in particular linear or straight-line arrangements, which can be arranged, for example, beside one another or one behind another.

Some or all processing lines B and/or transfer systems 4 can dispense or release the processed lenses 2 preferably to separate and/or common handoffs 6, 6A and 6B, as indicated by way of example in FIG. 5.

As an alternative or in addition, individual processing apparatuses 3 can be upstream and/or downstream from one or more production lines B and/or transfer systems 4, as indicated by way of example in FIG. 5. For example, the processing apparatuses 3F and 3G that can be used together—here in the area of the handoff 6B—which can be used if necessary or as desired are downstream from the two processing lines B4 and B5 or the two transfer systems 4B and 4C, which processing apparatuses can be used if necessary or selectively. In addition, the common processing apparatus 3E in the area of the handoff 6 is downstream from the processing lines B4, B5 additionally together with the processing lines B1 to B3 and/or from the transfer systems 4B, 4C additionally together with the transfer system 4A, which processing apparatus also handoff 6 in turn can be used selectively or if necessary, but also can be omitted or bypassed.

The transport system 22 preferably also forms a ring arrangement and/or preferably makes possible a circulation or circular conveying K, as indicated in FIG. 5. This is conducive in particular to an intermediate storage of the lenses 2 that are to be processed and/or their selective conveying to a desired processing line B and/or a desired transfer system 4, wherein a simple and/or more compact structure is made possible.

The preferred combination of at least one ring arrangement or circulation or circular conveying K of the (upstream) transport system 22 with at least one (downstream) ring arrangement or circulation or circular conveying K of a processing line B or a transfer system 4 represents an especially preferred, in particular independently-achievable aspect of this invention. Thus, an intermediate storage and/or flexible conveying to various processing lines B and/or processing apparatuses 3 can be carried out namely in a simple way.

The system 1 and/or transport system 22 preferably has an intake 7 for receiving lenses 2 that are to be processed or lens carriers 5 equipped therewith. The intake 7 is preferably connected or can be connected via an inlet or the like to corresponding other facilities or apparatuses and/or can be loaded with the lenses 2.

The new lenses 2 that are to be processed and in particular are already detected are fed into the transport system 22 or the preferred circulation or circular conveying K.

Figure 6:
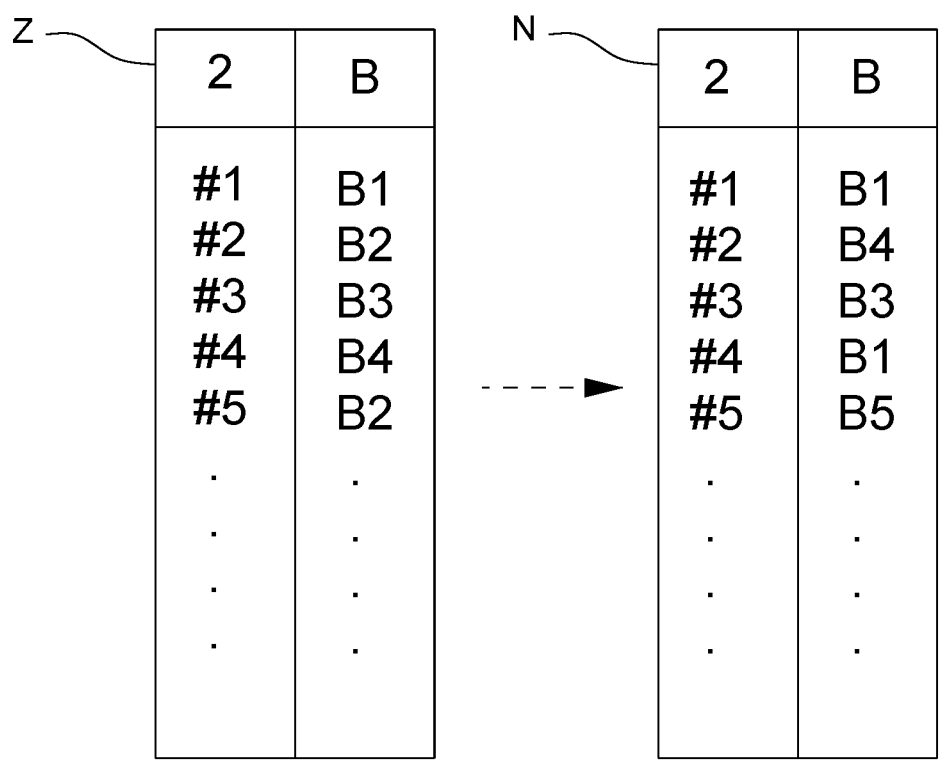
FIG. 6 is a schematic depiction of a proposed assignment of lenses that are to be processed to production lines and the new assignment thereof.

The conveying of the lenses 2 that are to be processed or lens carriers 5 equipped therewith to the respective processing line B or the respective transfer system 4, thus in particular from the transport system 22 via one of the branches 23 and feeds 24, is carried out preferably based on assignment parameters and/or corresponding to a (preceding) assignment Z, as shown in FIG. 6 by way of example. In particular, the assignment Z is carried out based on the assignment parameters.

In the illustrative example, the assignment Z preferably indicates which lens 2 (in the depiction according to FIG. 6 identified by way of example by a lens number #1, #2, #3, etc.) is assigned to which processing line B and accordingly is to be conveyed to the latter.

The assignment Z can be implemented in particular by a table, a database, or another stored value or entry or the like. The assignment Z can be carried out individually, in pairs, or in groups, wherein the lenses 2 that are usually to be produced as pairs are especially preferably also assigned as pairs to the same processing line B and are conveyed to said processing line as lenses 2 that are to be processed.

For the lenses 2, the assignment Z can be determined, kept available or managed—in particular by the system control 21 or the control center 25 and/or 26 thereof—individually, in pairs or combined for multiple or all lenses 2, in particular for all that were already detected and still have to be conveyed to one of the processing lines B and/or are still located in the transport system 22.

The assignment parameters take into consideration, reflect and/or comprise in particular maintenance that is due or to be expected and/or associated downtimes as well as job information A, production data P and/or status information S, especially preferably the respective processing plan, necessary processing steps, necessary processing accuracies, requirements with respect to the dimensions that are to be processed and/or to the material that is to be processed, requirements pertaining to the necessary tools, value lists, precedence (priority) of jobs, processing tasks and/or lenses 2 and/or the availability or capability of individual processing lines B, transfer systems 4 and/or processing apparatuses 3. For example, a processing apparatus 3A of a processing line B can be set to block to a certain size, and a processing apparatus 3A of another processing line B can be configured to block to another size. Taking into consideration such requirements or assignment parameters, the lenses 2 are then assigned and in particular are also conveyed to the appropriate processing lines B.

The (first) assignment Z is carried out preferably by a specified distribution or random distribution, by a corresponding requesting of a processing line B or by the system control 21, wherein the assignment Z can be displayed, examined and/or changed preferably by means of the control center 25 and/or 26.

The transport system 22 or the system 1 preferably begins with the conveying of the lens 2 to the respective production line B that is assigned in each case. Especially in the case of larger systems 1, this conveying requires a conveying time that is not insignificant.

According to an especially preferred, also independently-achievable aspect of this invention, the assignment Z of already assigned lenses 2 is examined upon detection or scheduling of a new maintenance and/or before actual discharge or transfer of a lens 2 from the transport system 22 to the assigned processing line B (thus in particular before the respective branch 23), specifically taking into consideration in particular the current assignment parameters, especially preferably taking into consideration changes in the assignment parameters after the last assignment Z. The assignment Z is then optionally changed, i.e., replaced by a new assignment N.

A change in the assignment Z or new assignment N can be caused by, for example, a processing apparatus 3 of a processing line B that is indispensable for the processing or a processing line B in general or a corresponding transfer system 4 being temporarily or permanently removed or blocked, for example, for servicing. In particular, individual lenses 2 can then be assigned to still other processing lines B, as illustrated by way of example by the new assignment N in FIG. 6. For example, here, the lens 2 with lens number #2 is newly assigned now to the processing lines B4 instead of to processing line B2.

In particular, it is thus possible that in the event of shutdown, failure, unavailability and/or servicing of a processing apparatus 3, the processing or lenses 2 provided for this processing apparatus 3 are taken over by another, in particular similar, processing apparatus 3 or are assigned to the latter.

Preferably, the examination of the assignment Z of already assigned lenses 2 or the new assignment N thus is carried out within the conveying time for one or more or all lenses 2.

The proposed examination and optional new assignment N are preferably carried out by the system control 21 and/or the control center 25 and/or 26 thereof or algorithms or macros stored there.

The change and new assignment N optionally can also be displayed by the control center 25 and/or 26 and/or, if required, checked. optionally examined or corrected or set by an operator.

The proposed examination of the assignment Z of already assigned lenses 2 and optional new assignment N makes it possible to adapt the system 1 to current circumstances, in particular in the case of changing conditions and requirements.

In particular, the examination of the assignment Z and optional new assignment N can be viewed or used as an adaptive pre-control.

It is especially to be emphasized that an optimization of the overall process is made possible, wherein the subunits, here the processing lines B, preferably finish or process the jobs O and/or lenses 2, preferably are executed or processed independently; thus, in particular, no central control that controls the complete production process on any level is necessary or provided. This is conducive to a simple and/or structured design and/or a simple or modular extension of the system 1.

In the described assignment Z, the jobs O or lenses 2 are assigned to the respective processing lines B. Accordingly, the term "line assignment" can also be used here.

The proposed determination of the assignment Z taking into consideration the assignment parameters, in particular the servicing that is due or to be expected or associated downtimes, or the examination of the assignment Z and optional change, i.e., new assignment N, can also be carried out alternatively or in addition in the case where lenses 2 are assigned to individual processing apparatuses 3 of a processing line B, i.e., on the "machine level." Such an assignment Z can also be referred to as "machine assignment" and is explained in more detail below by way of example.

The assignment Z of individual lenses 2 to a specific processing apparatus 3 (for the next processing task) is carried out in particular upon the corresponding request of the respective processing apparatus 3, as already described. In this connection, corresponding assignment parameters, as already described above, can also be taken into consideration. Thus, a(n) (first) assignment Z is then carried out.

The above-mentioned assignment Z or another assignment Z is preferably always updated or managed in the system control 21. Optionally, a display, and, as appropriate, corrections can also be carried out via the control center 25 or 26 that is not shown in FIG. 1 but is preferably provided.

The assignment Z of already assigned lenses 2 is preferably examined after or before each processing of a lens 2 and/or each time before conveying of a lens 2 to the assigned processing apparatus 3, for example, when a processing apparatus 3 requests an assigned lens 2, in particular taking into consideration the then current assignment parameters, and is optionally changed or replaced by a new assignment N.

In the case of a new assignment N, for example, a lens 2 that is already to be processed as the next one being shaped in the processing apparatus 3C could then no longer be assigned to this processing apparatus 3C but rather instead another lens 2 is assigned that is primarily to be processed, for example. As an alternative or in addition, another processing apparatus 3C (if present) could then optionally be passed over for the original lens 2, i.e., could be newly assigned to the latter.

Preferably, the examination of the assignment Z of already assigned lenses 2 and optional new assignment N is carried out by the system 1 or processing lines B or control apparatus 21, which is designed in particular in a corresponding manner.

Optionally, the change and new assignment N can also be displayed by the control center 25 and/or 26 and/or, as appropriate, examined or corrected by an operator.

The proposed examination of the assignment Z of already assigned lenses 2 and optional new assignment N makes possible an adaptation of the overall system and/or the system 1 to current circumstances, in particular in the case of changing conditions and requirements.

It is to be noted that an optimization of the overall process is made possible, wherein the subunits, here the processing lines B, finish or process the jobs O or lenses 2, preferably independently; thus, in particular, no central control that controls the complete production process on any level is necessary or provided. This is conducive to a simple and/or structured design and/or a simple or modular extension of the system 1.

Optionally, individual or all processing lines B and/or transfer systems 4 can have a (common or separate) rearward conveying connection 16 to the transport system 22, so that in the event of an outage or overload of a processing line B or a processing apparatus 3 of the processing line B (for example, because of a maintenance that is due or necessary or that is to be carried out directly or because of a processing quality that is impaired or no longer sufficient), a rearward conveying and/or reverse feeding of lenses 2 that are not processed or not completely processed is possible in order then to assign and to convey the latter to other processing lines B. Such an optional rearward conveying connection 16 is indicated in dotted lines in FIG. 5. As an alternative or in addition, such a rearward conveying connection 16 can also be provided, for example, between a separate or common handoff 6 and the transport system 22.

In the illustrative example, the blocking apparatuses or processing apparatuses 3A of the various processing lines B can be—at least partially—differently equipped, for example, fitted or equipped with block rings of different diameters or for block connections with different diameters. The lenses 2 are then correspondingly assigned and conveyed according to the necessary or desired size of the block connection to the respective blocking apparatuses or processing apparatuses 3A.

In general, it is noted that the processing lines B in each case, by themselves and/or together with other processing lines B, make possible or achieve an already-described ring arrangement or circulation or circular conveying K, in particular by a corresponding design of the related or assigned transfer or transport systems 4, 22.

The system control 21 is preferably central or arranged on a site of the system 1 and/or distributed on multiple sites or other locations. For example, this can be a server on which corresponding programs or macros run and which can be accessed remotely.

In general, the system control 21 can also be carried out and/or controlled, if necessary, in a location-independent manner by the respective system 1. The same preferably also applies for the optional control center 25 and/or 26.

Optionally, the system 1 can also be distributed on multiple sites or other locations. In particular, processing lines B of the system 1 can be built up on various sites and other locations. Sub-systems are also then formed on the various sites.

The control of the sub-systems and/or processing lines B at the various sites is carried out preferably via a central or common system control 21 and optionally common control center 25 and/or 26.

The possible assignment Z of jobs O to different sub-systems or sites and corresponding forwarding can also be referred to as "site assignment."

Especially preferably, the machine assignment, line assignment and site assignment can also be combined with one another as desired and/or carried out or performed and/or examined or changed or newly assigned by the same system control 21 or different system controls 21.

The system control 21 or the control center 25 and/or 26 thereof and/or a database connected thereto (not shown) preferably manages instructions for maintenance of the individual processing apparatuses 3. The instructions comprise, in particular, written guidance, drawing depictions, and/or animations or movies in order to be able to show, explain or describe to a technician on site, i.e., at the respective processing apparatus 3, the maintenance that is to be carried out in each case.

The instructions for maintenance, and specifically the instructions that are necessary for the respective maintenance, can preferably be output, in particular can be displayed, in a decentralized manner at the respective processing apparatus 3. Especially preferably, the output or display is carried out on a screen or the operating console 17 of the respective processing apparatus 3 and/or on a mobile screen or computer, such as a smartphone, a laptop, or the like. However, other technical implementations for output are also possible.

Especially preferably, the system control 21 or the control center 25 and/or 26 thereof also makes possible management or organization of the materials necessary for maintenance, wherein maintenance is planned or carried out in particular only based on the availability of the necessary materials, and/or missing materials are preferably automatically requested or brought to an operator's attention.

The system 1 or the system control 21 or the control center 25 and/or 26 thereof is or are preferably designed for detecting and evaluating errors or drifting of the processing task(s). In particular, measuring is done by means of the processing apparatus(es) 3E for checking, testing or measuring.

The evaluation of the measurements for detecting errors or drifting is done preferably by a statistical search for sources of error and/or by intelligent or automated interpretation of error patterns in order to identify one or more processing apparatuses 3 or processing lines B that are responsible for errors or drifting of the processing task(s).

Based on the result of the evaluation, required maintenance is scheduled, indicated and/or proposed by the system control 21 or the control center 25 and/or 26 is scheduled, indicated and/or proposed. As an alternative or in addition, the assignment Z can be adapted correspondingly—in particular automatically—in particular so that processing apparatuses 3 or processing lines B that require maintenance are no longer used for further processing operations or only for processing operations with lower quality requirements.

In particular, a method and a system 1 for processing optical lenses 2 are proposed. The lenses 2 are conveyed to individual processing apparatuses 3 or processing lines 8 corresponding to the assignment Z. The respective assignment Z preferably takes into consideration maintenance that is due and/or to be expected and other assignment parameters, such as the availability and capability of processing apparatuses 3 or processing lines B. The assignment parameters therefore preferably also comprise maintenance that is due, in particular already planned or scheduled, and/or to be expected, or associated downtimes.

Preferably, an assignment Z that is already carried out is examined before the actual or ultimate conveying and/or when there is a change in the assignment parameters and optionally is changed in a corresponding manner, taking into consideration the current assignment parameters, in order to adapt to current circumstances.

As an alternative or in addition, jobs O for processing lenses are forwarded to the systems 1 or processing lines B at different sites based on corresponding assignment parameters.

Optionally, an examination and, as appropriate, a change in the assignment Z are carried out when new jobs O and/or significant changes in the assignment parameters are detected. Accordingly, an especially efficient processing is made possible.

In addition, the proposed system 1 and the proposed method make possible an especially good use of available tools, processing apparatuses 3, processing lines B and/or other operating means.

Individual aspects and features of the described systems 1 as well as the described processes, methods and various embodiments can also be carried out independently of one another, but also in any combination.

Finally, at this point, the following should again be noted or reference should be made to the following definitions:

A "processing apparatus" in the sense of this invention is preferably a machine or an assembly that can operate without additional components. Preferably, a processing apparatus is stand-alone and/or the processing apparatus can autonomously perform processing of lenses. Especially preferably, a processing apparatus is designed as a stand-alone module, so that a system or a facility can have multiple such modular processing apparatuses or can be built up or put together from the latter. Thus, the system or the installation can be adapted or customized individually to operating steps to be performed, a number of lenses to be processed (per unit of time), and/or financial and/or spatial requirements or options of an operator of the installation or system.

"Maintenance/Servicing" is preferably defined according to the invention as the inspection, overhauling or repair and/or upgrading of processing apparatuses.

The term " " is used according to the invention preferably synonymously for the above-mentioned servicing measures (maintenance, inspection, overhauling, repair, and/or upgrading) or is preferably to be defined in this sense.

What is claimed is:

1. A method for processing optical lenses, comprising
processing the lenses selectively by at least one of different processing apparatuses and processing lines with multiple processing apparatuses corresponding to an assignment,
determining when lenses produced are adversely affected by the need for maintenance of at least one of the individual lenses processing apparatuses, and
carrying out a central management of instructions for maintenance of all of the individual processing apparatuses at a first location that is remote from the processing apparatuses, and outputting or indicating the respective instructions for remote implementation at a second location where the respective processing apparatus is located,
wherein said instructions comprise at least one of written guidance, drawing depictions, animations or movies which guide a user/technician through how the maintenance is to be carried out and
wherein, when said determining step detects a need for servicing of at least one of the individual lenses processing apparatuses, a system control or control center automatically schedules servicing and causes affected processing apparatuses or production lines to no longer be used for further processing tasks or to be used only for processing tasks with lower quality requirements than required for the affected lenses.

2. The method according to claim 1, wherein the outputting or indicating is carried out on a screen or an operating console of the respective processing apparatus.

3. The method according to claim 1, wherein the outputting or indicating is carried out on at least one of a mobile screen, mobile computer, smartphone or laptop.

4. The method according to claim 1, further comprising automatically controlling which instructions are output or indicated while taking into consideration the respective processing apparatus and the scheduled or necessary maintenance.

5. The method according to claim 1, wherein material necessary for the maintenance is automatically requested or ordered.

6. The method according to claim 1, further comprising using a system control or processing line to manage or detect maintenance of the processing apparatuses that is expected or anticipated downtimes resulting therefrom, and determining or changing the assignment based at least in part on said maintenance or downtimes.

7. The method according to claim 6, wherein the managing or detection is performed by detection of errors or drifting of at least one processing task using measurements obtained by one or more measuring or testing systems of the processing apparatuses or processing lines, wherein said measurements used for detection of errors or drifting are evaluated for sources of error to identify one or more processing apparatuses or processing lines that are responsible for the errors or drifting of the processing task.

8. The method according to claim 1, further comprising:
processing the lenses selectively by at least one of different processing apparatuses and processing lines with multiple processing apparatuses corresponding to an assignment, and
using a system control or processing line to manage or detect maintenance of the processing apparatuses that is expected or anticipated downtimes resulting therefrom, and determining or changing the assignment based at least in part on said maintenance or downtimes,
wherein the managing or detection is performed by detection of errors or drifting of at least one processing task using measurements obtained by one or more measuring or testing systems of the processing apparatuses or processing lines,
wherein said measurements used for detection of errors or drifting are evaluated for sources of error to identify one or more processing apparatuses or processing lines that are responsible for the errors or drifting of the processing task.

9. The method according to claim 8, wherein the assignment is determined or changed in such a way that maintenance of the processing apparatuses that is due or expected is temporally equalized.

10. The method according to claim 8, wherein the assignment is controlled in such a way that maintenance that is due or expected occurs at a time with lower utilization.

11. The method according to claim 8, wherein errors or drifting of the processing are detected, and at least one processing apparatus that is responsible for said errors or drifting is detected in order to carry out the maintenance thereof.

12. The method according to claim 8, wherein at least one of a processing apparatus or a processing line for which maintenance is due or is being carried out is no longer assigned or is blocked for further processing operations.

13. The method according to claim 8, wherein based on detected or probable errors or drifting of the processing, maintenance intervals for at least one processing apparatus that is responsible for said errors or drifting are adjusted or scheduled.

14. The method according to claim 8, wherein at least one of a central management, ordering of maintenance intervals or maintenance measures is carried out.

15. The method according to claim 8, wherein an ordering of materials for maintenance is carried out.

16. The method according to claim 8, wherein a maintenance of a processing apparatus that is due is brought forward based on at least one of the utilization or availability of another processing apparatus for the same processing.

17. The method according to claim 8, wherein in the event of maintenance of a processing apparatus, the processing operations or lenses intended for this processing apparatus are taken over by another, similar, processing apparatus or are assigned thereto.

18. The method according to claim 8, wherein the processing apparatuses select or request new jobs or lenses for processing independently or autonomously, wherein different processing apparatuses automatically request from a transfer system individual lenses to be processed, carry out the respective necessary processing and then deliver the lenses back again to the transfer system after the processing.

19. The method according to claim 8, wherein maintenance that has been carried out is forwarded as status information from the processing apparatuses.

20. The method according to claim 19, wherein the processing apparatuses exchange said status information.

21. The method according to claim 8, wherein an assignment that has already been made is checked at least one of before the actual or ultimate conveying or when changing the current assignment parameters, and is changed as required by a new assignment.

22. The method according to claim 8, wherein when new jobs are detected, a checking and, as required, a change in the assignment is carried out.

23. The system according to claim 1, wherein servicing that is scheduled is delayed when a job backlog exists or is implemented when the utilization of the processing lines is low or when another production line or processing apparatus is available for the same lens processing tasks.

24. A system for processing optical lenses, comprising multiple processing apparatuses forming at least one processing line, and a system control,
wherein at least one of the system control or the processing line is constructed for assignment of lenses to at least one of a processing line or a processing apparatus at least for the next processing,
wherein the system control or the processing line has means for central management of instructions for maintenance of the individual processing apparatuses at a first location that is remote from the processing apparatuses, and means for outputting the respective instructions for remote implementation at a second location where the respective processing apparatus is located,
wherein the system is constructed for performing the management or detection of a need for maintenance by detection of errors or drifting of at least one lens processing task using measurements obtained by one or more measuring or testing systems of the processing apparatuses or processing lines, and for evaluation of said measurements used for detection of errors or drifting for sources of error to identify one or more processing apparatuses or processing lines that are responsible for the errors or drifting of the processing task;

wherein measurement data of the processing apparatuses or processing lines are used to identify processing apparatuses or processing lines, which are definitely or possibly responsible for said errors or drifting, measurement data being evaluated for detecting said errors or drifting by a statistical search for sources of error and/or by intelligent or automated interpretation of error patterns in order to identify one or more processing apparatus or production lines responsible for said errors or drifting, and wherein, upon detection of a need for maintenance of at least one of the individual lenses processing apparatuses, the system control automatically schedules servicing and causes affected processing apparatuses or production lines to no longer be used for further processing tasks or to be used only for processing tasks with lower quality requirements than required for the affected lenses.

25. The system according to claim 24, wherein the system control or the processing line has means for outputting the respective instructions for remote implementation at a second location where the respective processing apparatus is located.

26. The system according to claim 25, wherein the system is constructed for outputting the respective instructions on a screen or an operating console of the respective processing apparatus or wherein the system is constructed for outputting the respective instructions on at least one of a mobile screen, mobile computer, smartphone or laptop.

27. The system according to claim 25, wherein the system control or the processing line is constructed for automatically controlling which instructions are output or indicated while taking into consideration the respective processing apparatus and the scheduled or necessary maintenance.

28. The system according to claim 24, wherein the system control is configured to automatically request or order material necessary for the maintenance.

29. The system according to claim 24, wherein the system control or the processing line is constructed for management or detection of maintenance of the processing apparatuses that is expected or anticipated downtimes resulting therefrom and for determining or changing the assignment taking into consideration said maintenance or downtimes.

30. The system according to claim 24, further comprising multiple processing apparatuses forming at least one processing line, and a system control, wherein at least one of the system control or the processing line is constructed for assignment of lenses to at least one of a processing line or a processing apparatus at least for the next processing, wherein the system control or the processing line is constructed for management or detection of maintenance of the processing apparatuses that is expected or anticipated downtimes resulting therefrom and for determining or changing the assignment taking into consideration said maintenance or downtimes, performing the management or detection of maintenance by detection of errors or drifting of at least one processing task using measurements obtained by one or more measuring or testing systems of the processing apparatuses or processing lines, and evaluation of said measurements used for detection of errors or drifting for sources of error to identify one or more processing apparatuses or processing lines that are responsible for the errors or drifting of the processing task.

31. The system according to claim 30, wherein the system control is constructed for determining or changing an assignment so that maintenance of processing apparatuses that is due or expected is temporally equalized.

32. The system according to claim 30, wherein the system control is constructed for determining or changing an assignment, so that a maintenance that is due or expected occurs at a time with lower utilization or is brought forward.

33. The system according to claim 30, wherein the system control is constructed for central management of materials for the maintenance.

34. The system according to claim 33, wherein the system control is constructed for at least one of planning the maintenance based on the availability of the materials necessary for the maintenance or for requesting the materials necessary for maintenance that is due or expected.

35. The system according to claim 30, wherein the system or the system control has means for detecting and evaluating at least one of errors or drifting of the processing, so that individual or multiple processing apparatuses, which are responsible for errors or drifting of the processing, are identified to arrange the maintenance thereof.

36. The system according to claim 30, wherein in the event of maintenance of a processing apparatus, the processing operations or lenses intended for this processing apparatus are taken over by another, similar, processing apparatus or can be assigned thereto.

37. The system according to claim 30, wherein the system comprises multiple independently-operating processing apparatuses, wherein the system has a transfer system for transport of the lenses to and from the processing apparatuses, wherein the transfer system has transfer apparatuses, which are arranged between two adjacent processing apparatuses, respectively, and wherein the transfer apparatuses have means for receiving and intermediately storing at least one lens.

38. The system according to claim 30, wherein the processing apparatuses comprise means to forward as status information the maintenance that has been carried out.

39. The system according to claim 38, wherein the processing apparatuses or the machine controls thereof are connected for exchanging said status information.

40. The system according to claim 30, wherein the system is distributed to multiple sites.

41. The system according to claim 30, wherein means for at least one of checking an assignment of already assigned lenses or performing a new assignment during a conveying time for individual, multiple or all lenses is provided, wherein said checking is performed when changing the current assignment parameters and when new jobs are detected, and a change in the assignment is carried out if needed.

42. A method for processing optical lenses, comprising
processing the lenses selectively by at least one of different processing apparatuses and processing lines with multiple processing apparatuses corresponding to an assignment,
determining when lenses produced are adversely affected by a need for maintenance of at least one of the individual lenses processing apparatuses, and
carrying out a central management of maintenance,
wherein, when said determining step detects a need for servicing of at least one of the individual lenses processing apparatuses, a system control or control center automatically schedules servicing and causes affected processing apparatuses or production lines to no longer be used for further processing tasks or to be used only for processing tasks with lower quality requirements than required for the affected lenses.

* * * * *